US012742685B2

(12) United States Patent
Koos et al.

(10) Patent No.: US 12,742,685 B2
(45) Date of Patent: Sep. 22, 2026

(54) METHOD FOR AN ARBITRARY WAVEFORM MEASUREMENT AND A SYSTEM TO OPERATE SAID METHOD

(71) Applicant: Karlsruher Institut für Technologie, Karlsruhe (DE)

(72) Inventors: Christian Koos, Siegelsbach (DE); Dengyang Fang, Karlsruhe (DE); Daniel Drayss, Karlsruhe (DE)

(73) Assignee: KARLSRUHER INSTITUT FUR TECHNOLOGIE, Karlsruhe (DE)

( * ) Notice: Subject to any disclaimer, the term of this patent is extended or adjusted under 35 U.S.C. 154(b) by 237 days.

(21) Appl. No.: 18/836,826

(22) PCT Filed: Feb. 9, 2023

(86) PCT No.: PCT/EP2023/053173
§ 371 (c)(1),
(2) Date: Aug. 8, 2024

(87) PCT Pub. No.: WO2023/152210
PCT Pub. Date: Aug. 17, 2023

(65) Prior Publication Data

US 2025/0044161 A1 Feb. 6, 2025

(30) Foreign Application Priority Data

Feb. 11, 2022 (EP) .................................... 22156379

(51) Int. Cl.
*G01J 11/00* (2006.01)
*H04B 10/61* (2013.01)

(52) U.S. Cl.
CPC .............. *G01J 11/00* (2013.01); *H04B 10/61* (2013.01)

(58) Field of Classification Search
CPC ........... G01J 11/00; H04B 10/61; H04B 10/07
(Continued)

(56) References Cited

U.S. PATENT DOCUMENTS 8,565,621 B2 * 10/2013 Ibragimov ........... H04B 10/616 398/208
12,119,882 B2 * 10/2024 Yoo .......................... G02F 7/00
(Continued)

FOREIGN PATENT DOCUMENTS

WO WO 2021/257603 12/2021

OTHER PUBLICATIONS

D. Fang et al., in the article ("Optical Arbitrary Waveform Measurement (OAWM) on the Silicon Photonic Platform," 2021 Optical Fiber Communications Conference and Exhibition (OFC), San Francisco, CA, USA, 2021, pp. 1-3.) (Year: 2021).*
(Continued)

*Primary Examiner* — Dalzid E Singh
(74) *Attorney, Agent, or Firm* — Woodard, Emhardt, Henry, Reeves & Wagner, LLP

(57) ABSTRACT

Method for detecting an electromagnetic use-signal (2401) comprising: providing an use-signal; Providing a reference signal (2201) comprising M discrete tones with M≥2; splitting the use-signal into N partial use-signals (2511) with N≥2; splitting the reference signal into N partial reference signals (2521); mixing each partial use-signal (2511-*n*) with the corresponding partial reference signal (2521-*n*) to generate (I) partial mixing signals (2531), wherein the nth mixing element (2530-*n*) generates $K_n$ partial mixing signals (2531-*n*); digitizing the partial mixing signals (2531) that (I) digitized partial mixing signals (2541) are generated; reconstructing the use-signal (2551) using a transformation that relates partial mixing signals to the use-signal and that comprises at least one model parameter related to a measurement property, characterized in that: at least one partial reference signal comprises at least two spectral tones, and the (I) of the partial mixing signals comprises redundant information to determine the parameter.

21 Claims, 21 Drawing Sheets

(58) Field of Classification Search
USPC ........................................................ 398/74
See application file for complete search history.

(56) References Cited

U.S. PATENT DOCUMENTS

| | | | | |
|---|---|---|---|---|
| 2008/0231488 | A1* | 9/2008 | Pickerd | G01R 13/0272 341/155 |
| 2022/0393771 | A1* | 12/2022 | Aref | H04B 10/07951 |
| 2023/0283383 | A1* | 9/2023 | Yoo | G02F 7/00 398/115 |

OTHER PUBLICATIONS

A. Khilo et al., "Photonic ADC overcoming the bottleneck of electronic jitter," Opt. Express 20, 4454-4469 (2012).
Chen, X., Xie, X., Kim, I., Li, G., Zhang, H., Zhou, B.: 'Coherent Detection Using Optical Time-Domain Sampling', IEEE Photonics Technology Letters, 2009, 21, (5), pp. 286-288.
Fang, D., et al.: 'Optical Arbitrary Waveform Measure-ment (OAWM) on the Silicon Photonic Platform', in: Op-tical Fiber Communica-tion Conference (OFC'21), San Diego (CA), USA, Jun. 6-11, 2021; The Optical Society of America (OSA); paper F2E.G.
Fischer, J.K., Ludwig, R., Molle, L., et al.: 'High-Speed Digital Coherent Receiver Based on Parallel Opti-cal Sampling', Journal of Lightwave Technology, 2011, 29, (4), pp. 378-385.
Fontaine, N.K., Raybon, G., Guan, B., et al.: '228-GHz 30 Coherent Receiver using Digital Optical Bandwidth Inter-leaving and Recep-tion of 214-GBd (856-Gb/s) PDM-QPSK'; In European Conference and Exhibition on Optical Communication, OSA Technical Digest (online) (Optical Society of America.
Fontaine, N.K., Scott, R.P., Heritage, J.P., Yoo, S.J.B.: 'Near quantum-limited, single-shot coherent ar-bitrary optical waveform measure-ments', Opt. Express, 2009, 17, (15), pp. 12332-12344.
Fontaine, N.K., Scott, R.P., Zhou, L., Soares, F.M., Heritage, J.P., Yoo, S.J.B.: 'Real-time full-field ar-bitrary optical waveform mea-surement', Nature Photonics, 2010, 4, (4), pp. 248-254.
J. Liu, E. Lucas, A. S. Raja, J. He, J. Riemensberger, R. N. Wang, M. Karpov, H. Guo, R. Bouchand, and T. J. Kippenberg, "Photonic microwave generation in the X- and K-band using integrated soliton microcombs," Nature Photonics 14, 486-491 (2020).
K. Kikuchi, "Fundamentals of Coherent Optical Fiber Com-munications," Journal of Lightwave Technology 34, 157-179 (2016).
Keysight Technologies, "Infinilum UXR-Series Oscillo-scopes," Data Sheet (2019).
Kieninger, C., Füllner, C., Zwickel, H., et al.: 'Sill-con-organic hybrid (SOH) Mach-Zehnder modulators for 100 GBd PAM4 signaling with sub-1 dB phase-shifter loss', Opt. Express, OE, 2020, 28, (17), p. 24693.
L. D. Coelho, O. Gaete, and N. Hanik, "An algorithm for global optimization of optical communication systems,", pp. 541-550.
N. K. Fontaine, R. P. Scott, and S. Yoo, "Dynamic optical arbitrary waveform generation and detection in InP pho-tonic integrated circuits for Tb/s optical communications," Optics Communications 284, 3693-3705 (2011).
Okamoto, K., Ito, F.: 'Dual-Channel Linear Optical Sam-pling for Simultaneously Monitoring Ultrafast Intensity and Phase Modula-tion', Journal of Lightwave Technology, 2009, 27, (12), pp. 2169-2175.
Scott, R.P., Fontaine, N.K., Heritage, J.P., Yoo, S.J.B.: 'Dynamic optical arbitrary waveform generation and measurement', Opt. Express, 2010, 18, (18), pp. 18655-18670.
Sunnerud, H., Skold, M., Westlund, M., Andrekson, P.A.: 'Charac-terization of Complex Optical Modulation Formats at 100 Gb/s and Beyond by Coherent Optical Sampling', Journal of Lightwave Technology, 2012, 30, (24), pp. 3747-3759.
Ummethala, S., Harter, T., Koehnle, K., et al.: 'THz-to-optical conversion in wireless communications using an ultra-broadband plasmonic modulator', Nature Photonics, 2019, 13, (8), pp. 519-524.
Ummethala, S., Kemal, J.N., Alam, A.S., et al.: 'Hybrid Electro-Optic Modulator Combining Silicon Photonic Slot Waveguides with High-k Radio-Frequency Slotlines' (Oct. 20, 2020).
Valley, G.C.: 'Photonic analog-to-digital converters', Opt. Express, 2007, 15, (5), 1955-1982.
Fang et al.: "Optical Arbitrary Waveform Measurement (OAWM) Using Silicon Photonic Slicing Filters", Journal of Lightwave Technology, IEEE, USA, vol. 40, No. 6, Dec. 1, 2021, pp. 1705-1717.
International Search Report for related PCT/EP2023/053173 mailed May 9, 2023.

* cited by examiner 2500
2551
2550
2541-1-1
2541-1-K1
2541-N-1
2541-N-KN
2540-1-1
2540-1-K1
2540-N-1
2540-N-KN
2531-1-1
2531-1-K1
2531-N-1
2531-N-KN
2530-1
2530-N
2511-1
2511-N
2521-1
2521-N
2510
2520
2401
2201

2000
2551
2500
2401
2201
2300
2200
2100
1000

2000
2551
2500
2401
2201
2300
2220
2200
2310
2100
1000
2210

2000
2551
2500
2401
2201
2300
2320
2220
2200
2330
2100
1000
2210

2000
2551
2500
2401
2201
2300
2320
2220
2200
2330
2310
2100
1000
2210

2000
2551
2500
2401
2201
2300
2340
2200
2310
2100
1000

2000
2300
2100
1000
2330
2320
2200
2401
2201
2500
2551

2000
2300
2551
2500
2401
2201
2200
2320
2330
2310
2340
2100
1000

2000
2500
2551
2550
2541-1-1
2541-1-2
2541-N-1
2541-N-2
2540-1-1
2540-1-2
2540-N-1
2540-N-2
2530-1
2530-N
2531-1-1
2531-1-2
2531-N-1
2531-N-2
2533
2532
2510
2511-1
2511-N
2520
2521-1
2521-N
2011
2010
2201
2200
2100
2401
1000

2000
2300
2551
2500
2401
2201
2330
2340
2340
2340
2340
2200
2100
1000

2551
use-signal [a.u.]
Time [ps]
2552
A
b
c
d
e
Power [dB]
Frequency [GHz]
2554
Power [dB]
Frequency [GHz]

METHOD FOR AN ARBITRARY WAVEFORM MEASUREMENT AND A SYSTEM TO OPERATE SAID METHOD

The technical field of this invention is teratronic signal processing, photonics and microwave engineering. Teratronic signal processing is focused on generating, measuring, and processing signals with a bandwidth up to several hundred GHz. The design of high-bandwidth systems depends on the field of photonics and microwave engineering.

The term arbitrary is used to indicate that the measured arbitrary signal has no inherent structure that is exploited by the measurement system.

State-of-the-art for detecting an arbitrary optical waveform, in the following referred to as use-signal, with good signal-to-noise ratio is based on intradyne coherent detection. An intradyne coherent receiver consists of a 90° optical hybrid, a pair of balanced photodetectors (BPD) and analog-to-digital converters (ADC) and allows to measure the in-phase and quadrature component of the use-signal. The optical bandwidth of such an intradyne coherent receiver is limited to twice the bandwidth of the limiting component, usually the ADC or BPD. For further details on coherent receivers one can refer to [14] or any other fundamental literature.

The bandwidth limitation imposed by the electronic components can be overcome by replacing the single coherent receiver with a coherent receiver array and using low noise optical frequency combs as multi-wavelength local oscillator. This concept has been used, e.g., in spectrally sliced coherent detection [3] and parallel optical sampling [4]. While spectrally sliced coherent detection has been demonstrated for the measurement of arbitrary optical use-signals, all demonstrations of parallel optical sampling have so far been limited to signals that have an inherent structure, e.g., data signals. In the following, the aforementioned methods and their limitations will shortly discuss.

Frequency sliced coherent detection was demonstrated in 2010 [3] for arbitrary optical waveforms. Frequency-sliced arbitrary optical waveform measurements use optical slicing filters, e.g., arrayed waveguide gratings (AWG), to separate the use-signal into several slightly overlapping spectral bands that can be individually detected by low-speed electronics. The local oscillator frequencies for detecting the individual spectral slices are positioned in the center of the respective slices. For the digital reconstruction of the use-signal from the measured narrowband frequency slices, the frequency difference between the local oscillator tones must be known precisely. Therefore, all local oscillator tones are derived from a coherent optical frequency comb by isolating individual tones with a bank of non-overlapping demultiplexing filters. The separately measured frequency bands are later digitally stitched to obtain a digital use-signal. The correct phase and amplitude for stitching can be directly obtained from a spectral overlap region between adjacent spectral slices. A receiver with an aggregate bandwidth of 228 GHz was demonstrated in 2012 [6]. The advantage of this method is a rather simple concept, good scalability, high fidelity, and the full compensation of the linear transfer characteristic of the receiver system. However, disadvantages arise when it comes to the monolithic integration of the optical slicing filters together with the coherent receiver array on a photonic integrated circuit (PIC), in particular when relying on high index-contrast integration platforms such as indium phosphide (InP) or silicon photonics. Slicing filters based on arrayed waveguide gratings suffer from fabrication errors, which creates the need for additional phase-error corrections [15]. Additional temperature stabilization might be needed [15]. In case of passive filters, all components in the system, e.g., frequency comb generators and slicing filters, need to be precisely aligned in frequency, and this alignment has to be kept over a wide range of operating conditions such as ambient temperatures. Some of those difficulties can be solved by frequency tunable coupled-resonator optical waveguide (CROW) filters [2] that can be dynamically adjusted and that be compactly integrated on the silicon photonic platform. Still, such filters introduce more complexity for controlling several heating elements per slicing filter. Furthermore, accurate temperature control becomes necessary and small temperature fluctuations may reduce the mid and long-term calibration accuracy. Therefore, a completely passive but compact structure, as it is used for systems based parallel optical sampling, simplifies the chip level integration significantly.

In [4], the concept of parallel optical sampling is demonstrated for the reception of 56 GBd QPSK data signals. In contrast to the spectrally sliced coherent reception, no optical slicing filters are needed, but simple power splitters are sufficient to split the use-signal and the multi-wavelength local oscillator into several paths. Consequently, the photonic integration of such a system is simpler compared to the spectrally sliced system. However, in [4] the authors only report the measurement of quadrature phase shift keying (QPSK) data signals and depend on multidimensional optimization procedures that exploit the structure of the transmitted data signals to compensate unknown phase parameters of the receiver system [16]. The system thus lacks the ability to measure arbitrary use-signals that do not have any a-priori-known structure. In addition, the local oscillator used for parallel optical sampling needs to produce narrow pulses in time domain to limit crosstalk between adjacent samples.

Apart from the two approaches mentioned above there exist more concepts for photonic assisted analog to digital conversion [5]. However, they are less relevant for this application because the concepts differ significantly from this invention. Further insights in spectrally sliced arbitrary waveform measurement systems can be found in [1, 2, 6, 7]. Further information related to the concept of parallel optical sampling and optical time division multiplexing (OTDM) can be found in [8-10].

The objective technical problem herein consists in providing a measurement method for an arbitrary electromagnetic signal which enables a reduction of the number of filters, or a reduction of the required filter steepness provided by the measurement system, where the term filter steepness refers to the steepness of the power transfer function, usually expressed in decibels (dB) at the edge of the filter passband. The method should be generally applicable to arbitrary signals, that do not need to have any a-priori-known structure. Additionally, the method should be able to compensate for drifts of system parameters, e.g., induced by temperature fluctuations. The method moreover needs to offer robust calibration techniques to compensate for characteristics of the measurement system.

This aforementioned objective technical problem is solved by the method disclosed herein according to the features of the first, independent claim 1. Subsidiary or dependent claims relating thereto reflect advantageous designs or embodiments. Advantageous further embodiments, which can be realized individually or in any combination, are shown in the dependent claims.

In the following, the terms "having", "comprising" or "including" or any grammatical variations thereof are used in a nonexclusive manner. Accordingly, these terms may refer both to situations in which, in addition to the features introduced by these terms, no further features are present, or to situations in which one or more further features are present. For example, the expression "A has B", "A includes B" or "A includes B" may refer both to the situation in which, apart from B, no other element is present in A (i.e. to a situation in which A consists exclusively of B), and to the situation in which, in addition to B, one or more other elements are present in A, for example element C, elements C and D or even other elements.

Furthermore, it is noted that the terms "at least one" and "one or more" as well as grammatical variations of these terms, when used in connection with one or more elements or features and intended to express that the element or feature may be provided once or more than once, are generally used only once, for example, when the feature or element is first introduced. When the feature or element is subsequently mentioned again, the corresponding term "at least one" or "one or more" is generally no longer used, without limitation of the possibility that the feature or element may be provided singly or more than once.

Further, the terms "preferably", "in particular", "for example (e.g.)" or similar terms are used hereinafter in connection with optional features, without limiting alternative embodiments thereby. Thus, features introduced by these terms are optional features, and it is not intended to limit the scope of protection of the claims, and in particular the independent claims, by these features. Thus, as will be recognized by those skilled in the art, the invention may be carried out using other embodiments. Similarly, features which are introduced by "in one embodiment" or by "in a further embodiment" are understood as optional features without intending to limit alternative embodiments or the scope of protection of the independent claims. Furthermore, all possibilities of combining features introduced thereby with other features, whether optional or non-optional, shall remain unaffected by these introductory expressions.

General Description and Embodiments

The invention does not require slicing filters with steeply decaying passbands and is hence well suited for photonic integration as it avoids potential fabrication inaccuracies of such filters [15], active controls [2, 15], or frequency drifts. The invention exploits frequency-domain calibration methods to compensate the transfer characteristics of the receiver system, as well as the influence of an imperfectly time interleaved local oscillator. This also comprises the compensation for non-equidistant optical sampling pulses. Furthermore, the method described in this invention is insensitive to the pulse shape of the local oscillator, i.e, it works equally well with a strongly dispersed local oscillator with temporally overlapping sampling pulses. For purely time domain methods overlapping sampling pulses would lead to increased computational complexity. Moreover, the invention can exploit redundant information comprised in the measured signals to estimate at least one but potentially various system parameters related, e.g., to the relative amplitude and phase among different local oscillator tones, to phase fluctuations introduced by propagation through waveguides and/or fibers, or to drift of the free spectral range of the local oscillator. Exploiting redundant information in spectral overlap regions enables the invention to measure arbitrary signals, as no a-priori-knowledge related to the structure of the signal itself necessary. This ability opens applications in the area of arbitrary waveform measurement or photonic assisted analog to digital conversion. Apart from the purely time-interleaved system, a hybrid system applying both spectral slicing and time interleaving is also feasible.

A first embodiment of a method according to the invention for detecting an electromagnetic use-signal with a measurement system comprising the following steps:

a. Providing an input interface for an electromagnetic input signal which is set up in such a way that an electromagnetic use-signal is provided;
b. Providing an electromagnetic reference signal source which is set up in such a way that an electromagnetic reference signal comprising M discrete tones with $M \geq 2$ is provided; and
c. Providing a subsystem, comprising:
   i. a first splitting element which is set up in such a way that the use-signal is split into a multitude of N partial use-signals with $N \geq 2$;
   ii. a second splitting element which is set up in such a way that the reference signal is split into a multitude of N partial reference signals, wherein N is the number of corresponding partial use-signals;
   iii. N corresponding mixing elements which are set up in such a way that each partial use-signal is mixed with the corresponding partial reference signal to generate a total number of $$\sum_{n=1}^{N} K_n$$

partial mixing signals, wherein the n-th mixing element generates $K_n$ partial mixing signals;
   iv. A number of $$\sum_{n=1}^{N} K_n$$

corresponding acquisition elements which are set up in such a way that the $$\sum_{n=1}^{N} K_n$$

partial mixing signals are digitized such that $$\sum_{n=1}^{N} K_n$$

digitized partial mixing signals are generated;
   v. a digital signal processor, that is setup in such a way that a digital use-signal is reconstructed from the digitized partial mixing signals using a transformation based on a system model that relates the $$\sum_{n=1}^{N} K_n$$

digitized partial mixing signals to the use-signal (2401) and that comprises at least one model parameter related to at least one of the properties of the measurement system, characterized in that:

d. at least one partial reference signal comprises at least two spectral tones, and e. the totality of all partial mixing signals comprises redundant information that is used to estimate the at least one model parameter of the measurement system.

Wherein the terms reconstructed digital use-signal and digital use-signal are used herein interchangeably.

Having at least one partial reference signal that comprises at least two spectral tones (d) allows to reduce the number of required slicing filters or the steepness of such filters and/or to increase the bandwidth of at least one passband of such filters can be reduced. Consequently, the hardware of the measurement system is simplified, and integration is facilitated. For example, the first and second splitting element could be implemented as power splitters with proper time delays. This can allow for schemes in which no slicing filters are needed and all partial reference signals comprise all spectral tones of the reference signal.

By making use of the redundant information that is comprised in the totality of all partial mixing signals to estimate the at least one model parameter of the measurement system, the system works with any input signal that matches the frequency range of the measurement system. More specifically, the measurement system is not limited to input signals with an inherent structure or any other kind for a-priori-known information, e.g., data signals, which follow certain patterns that are related to the underlying modulation formats, pulse shapes, and symbol rates. The frequency range of the measurement system, i.e., the frequency range within which arbitrary waveforms can be detected, is dictated by the frequency range of the reference signal. More precisely, the lower limit of the frequency range of the measurement system is given by $f_1$-B, and the upper limit is given by $f_M$+B, where $f_1$ is the lowest-frequency reference-signal tone that may still generate mixing products with the use-signal and $f_M$ is the highest-frequency reference-signal tone that may still generates mixing products with the use-signal and B is the bandwidth limit of the combination of mixing element and acquisition element.

As used herein, the term "measurement system" refers to the system described in the enclosed invention which is used to measure an electromagnetic signal. The bandwidth of the measurement system exceeds the bandwidth of the individual acquisition elements, which may, e.g., contain electronic analog-to-digital converters. The measurement system does not depend on any structure or a-priori information related to the input signal and can therefore measure arbitrary signals.

As used herein, the "input interface" enables the coupling of the input signal to the measurement system and provides the use-signal to the subsequent components. Examples for an input interface are:

Electrical conductive means, e.g. a cable, a coaxial cable, a waveguide, a probe, etc.

An optical fiber, an optical waveguide, photonic wire-bond, grating coupler, edge coupler, etc.

Free space coupling of optical signals with lenses, mirrors, phased arrays, optical fibers, lensed optical fibers, Free space coupling of electrical signals, e.g. via an antenna, focusing elements, or Any other means to couple a signal into a technical system As used herein, the term "use-signal" refers to the input signal of the measurement system, which is provided by the input interface, or to the input signal of the measurement which is provide by the input interface and additionally modified by a modifying element. The modifying element is optional (see claim 4).

As used herein, the "reference signal source" provides a clean reference signal, which is used as multi-wavelength local oscillator. The reference signal source may comprise several components such as pump sources, lasers, frequency-comb generators, oscillator, filter, resonators with nonlinear electromagnetic properties, modulators, amplifiers, mode-locked or gain-switched laser diodes, fiber lasers, solid-state lasers, or any other components suited for generating, transmitting, amplifying, controlling an electromagnetic signal with multiple discrete spectral tones. Apart from providing the reference signal, the reference-signal source may additionally provide a signal to the modifying element, e.g., to generate a phase locked stitching signal, or provide a phase locked optical carrier to an electro-optic modulator that is optionally part of the modifying element. Furthermore, the reference signal source might be synchronized to the acquisition elements.

As used herein, the "first splitting element" is used to split the use-signal into N partial use-signals. The first splitting element imposes transfer characteristic on each of the N output signals. Examples for this transfer characteristic are:

a group delay for each output, or a filter function that includes a frequency-dependent phase and amplitude response for each channel As used herein, the "second splitting element" is used to split the reference signal into N partial reference signals. The second splitting element imposes a transfer characteristic on each of the N output signals. Examples for this transfer characteristic are:

a group delay for each output, or a filter function that includes a frequency dependent phase and amplitude response for each channel As used herein the term "mixing element", refers to an element, that carriers out a nonlinear operation. Each mixing element has at least two inputs, namely one for the partial use-signal and one for the corresponding partial reference signal, and produces $K_n$>=1 outputs, namely $K_n$ partial mixing signals, where n=1, . . . N refers to the $n^{th}$ mixing element. All N mixing elements produce in total partial mixing signal. The $K_n$ outputs of the n-th mixing element are obtained by a nonlinear interaction of the partial use-signal and the corresponding partial reference signal or of any signal components derived from the respective partial use and reference signals, e.g., by use a 90° optical hybrid.

Examples for mixing elements are:

Photodetectors, e.g. photodiodes, photoresistors, phototransistors, etc.

Balanced photodetectors

Phase diversity receiver, e.g. a coherent receiver comprising a 90° optical hybrid and a pair of balanced photodetectors a diode mixer any other nonlinear element that operates in the correct frequency range As used herein, the term "mixing" refers to the functionality provide by the mixing element.

As used herein, the term "acquisition element" refers to an element that comprises at least one device such as analog-to-digital converter to digitize the corresponding $k^{th}$ partial mixing signal produced by the $n^{th}$ mixing element. There is a total number of at least $$\sum_{n=1}^{N} K_n$$

acquisition elements. In addition, each acquisition element might comprise optionally electronic building blocks that are common to the digital-to-analog conversion such as:

- an analog front end that can include amplifiers, attenuators, filters, connectors, waveguides, or
- a digital backend that can include a digital storage, a processor, a communication interface.

As used herein, the term "digital reconstruction" refers to a series of operations that are performed by the "digital signal processor" to the digitized partial mixing signals to reconstruct the digital the use-signal or a part thereof. Furthermore, some operations of the optionally present modifying element can be reverted (Claim 3). The transformation applied during the reconstruction of the digital use-signal is based on a system model that relates the $$\sum_{n=1}^{N} K_n$$

digitized partial mixing signals to the use-signal. Most model parameters are characterized during a system calibration procedure. However, at least one of the model parameters is either unknown or time variant and must therefore be determined individually for each measurement or for a set of measurements that are performed in a time span, during which the change of the at least one unknown model parameter can be neglected. For such measurement or such set of measurements, the at least one model parameter is determined by using the system model in conjunction with the redundant information comprised in the digitized partial mixing signals, which together define a set of relations, from which the at least one model parameter can be extracted. The model parameters may be extracted by directly solving the set of relations using widely known numerical techniques. Alternatively, the set of relations may be overdetermined such that the at least one unknown model parameter can be estimated by using, e.g., parameter-estimation techniques that rely on minimization of a certain cost metric. More specifically, and without limitation, the system model can be given by $$x_{n,k} = \hat{L}_{n,k}\{s\} = L_{n,k}\left\{\begin{bmatrix} s(f-f_1) \\ \vdots \\ s(f-f_M) \end{bmatrix}\right\}, \tag{1}$$

Wherein:

- s refers to the use-signal
- $s(f-f_\mu)$ refers to the use-signal that is frequency shifted by $f_\mu$, where $f_\mu$ is related to the discrete tones of the reference signal and $\mu=1, \ldots, M$.
- $x_{n,k}$ refers to the $k^{th}$ digitized partial mixing signal generated by the $n^{th}$ acquisition element, where $k=1, \ldots, K_n$, and $n=1, \ldots, N$.
- $L_{n,k}\{\cdot\}$ and $\hat{L}_{n,k}\{\cdot\}$ refer to the transformation that links the use-signal to the digitized partial reference signals. This transformation may link M frequency-shifted copies of the use-signal to the $$\sum_{n=1}^{N} K_n$$

digitized partial mixing signals. If the bandwidth of the splitting, the mixing, and the acquisition elements is chosen large enough, and the transfer characteristic of the splitting element is chosen correctly, then $L_{n,k}\{\cdot\}$ ($\hat{L}_{n,k}\{\cdot\}$) is transforming the redundant frequency shifted copies in such a way, that redundant information is preserved in $x_{n,k}$, and that this preserved redundant information can be used to determine the at least one model parameter. The digital use-signal is reconstructed by inverting the transformation $L_{n,k}\{\cdot\}$ ($\hat{L}_{n,k}\{\cdot\}$).

Note that additional components such as fibers or waveguides connecting different components, amplifiers to boost the signal power or filters might be present in the setup for technical reasons, e.g., as shown in FIG. 13. These components are all accounted for by the transformation $L_{n,k}\{\cdot\}$ ($\hat{L}_{n,k}\{\cdot\}$).and therefore also part of the system calibration. However, as these components are not relevant for the fundamental concept they are not further discussed in the following description.

In a further embodiment for the variables M and N the following relation applies: $M \leq N$.

In the special case M=N, the number of discrete tones M of the reference signal matches the number of mixing elements. Assuming this case in combination with spectrally equidistant tones, the bandwidth the mixing elements and the subsequent acquisition elements should at least slightly exceed the spacing of the tones.

In the case that N>M, there are more mixing elements N than there are discrete tones M of the reference signal. In this case, the system is significantly overdetermined with respect to the use-signal, which reduces noise in the reconstructed digital use-signal. Such configurations allow to improve the signal-to-noise ratio of the reconstructed use-signal at the cost of providing more mixing and acquisition elements.

In a further embodiment for the variables M and N the following relation applies: M>N.

In the case that M>N the system model may be underdetermined if the use-signal covers the full bandwidth of the reference signal and if the mixing elements and the subsequent acquisition elements have bandwidths smaller than the spacing of any two tones of the reference signal. In this case signal reconstruction of arbitrary signals is not possible, due to spectral superposition of signal components. However, if the use-signal is band limited such that only M-R tones of the reference signal contribute to the measured digital partial mixing products and N>=M−R, then the additional R tones of the reference signal can be neglected, and digital signal reconstruction is possible. The case M>N might be of particular interest if for technical reasons it is difficult to obtain a reference signal with exactly the desired number of tones. If the use-signal is strictly band limited and M>N, this allows to measure use-signals with different center frequencies without adapting the reference signal source as long as the use-signal is within the bandwidth defined by the M reference signal comb lines and has a bandwidth that does not exceed the maximum measurement system bandwidth. In case of a reference signal that consists of equidistant spectral tones, separated by a free spectral range $f_{FSR}$, and assuming identical mixing and acquisition elements of bandwidth B, the maximum measurement system bandwidth would be given by $2B+(M-R-1)\times f_{FSR}$. The bandwidth defined by the M reference signal tones is given by $2B+(M-1)\times f_{FSR}$In a further embodiment, an additional modifying element is provided, which is setup in such a way that the use-signal which is provided by the input interface is modified by applying one or more of the modifying operations listed below. The modifying element has at least one input and at least one output for the use-signal, but might have additional optional inputs and outputs, connecting it to the reference signal source or to another element which is part of the measurement system, e.g., the acquisition element or the digital signal processor. The connection to the reference signal source allows the modifying element to produce signals or signal components that are strongly phase correlated with the reference signal. The connection with the acquisition element allows to synchronize signals produced by the modifying element to the acquisition elements, which helps to remove effects introduced by the modifying element. The connection with the digital signal processor allows helps to digitally remove effects introduced by the modifying element.

The main output signal of the modifying element is referred to as use-signal. In the following, modifying operations are listed. Either none, one, or more than one modifying operations are performed in any order:

1. converting the use-signal, e.g., by means of a modulator that transfers the use-signal from one carrier frequency to another,
2. complementing the use signal with auxiliary signal components that are used in the further processing of the use-signal, e.g., stitching signals as explained below,
3. applying a frequency dependent transfer function (a filter) to the use-signal,
4. amplifying the use-signal,
5. attenuating the use-signal,
6. dispersing the use-signal, and/or
7. modulating stitching signals onto the use-signal.

In the following, an exemplary selection of different modifying operations mentioned above are listed:

1. Providing a measurement system with a center frequency $f_C$ which is defined as the mean frequency of all reference signal tones, and a measurement bandwidth BW, then only use-signals with frequency components within a "measurement band" of with BW around $f_C$ can be measured directly. To enable the measurement of signals outside this measurement band, the use-signal is converted into the measurement band. Examples for such converters are:
   a. an electro-optic modulator (Mach-Zehnder-Modulator, phase modulator, IQ modulator)
   b. an electro-absorption modulator,
   c. an acousto-optic modulator,
   d. an electro-optic crystal,
   e. a radio frequency mixer,
   f. a nonlinear optical device, relying, e.g., on second or third-order optical nonlinearities, or
   g. a photodetector.
2. The redundant information in the digitized partial mixing signals depends on the use-signal. In certain cases, it is therefore beneficial to add a stitching signal to the use-signal to ensure that the at least one model parameter can be reliably determined independent of the input signal of the measurement system. Preferably the stitching signal is as low in power as possible such that the at least one model parameter can still be reliably determined but the use-signal is not significantly distorted. Even more preferably, the added stitching signal is known, e.g., by additional monitoring, such that after digital reconstruction, the modification can be digitally reversed by subtracting a digital stitching signal. Stitching signals are, e.g., useful in case of use signals, for which the spectral range that should contain the redundant information, might have little or no spectral components, thereby rendering the estimation of the at least one model parameter difficult. The operation of adding signals could for example be embodied by the following components or combinations thereof:
   Directional couplers, or
   Multi-mode interference coupler, or
   Optical filters, or
   Circulators.
3. Before measuring the use-signal a filter is optionally applied. For example to:
   a. remove out of band noise,
   b. limit the bandwidth to the bandwidth of the measurement system, or
   c. suppress one or more signal frequencies of the use-signal, that are not of interest for the measurement. If high power components are suppressed, then this can improve the fidelity of the measurement of the remaining weak use-signal components.
4. If the input signal is low in power, the noise of the digital use-signal can be reduced by amplifying the use-signal to a previously determinable higher power level.
5. If the signal power is too high, then the use-signal must be attenuated to protected subsequent components from damage. In addition, to high signal power can increase distortions in the digitized use-signal due to parasitic nonlinear behavior of the mixing and acquisition elements.
6. The measurement of ultra-short pulses can lead to a poor signal-to-noise ratio, as the noise introduced by the acquisition elements scales with the full range of the analog-to-digital converters inside. Thus, a high peak-to-average power ratio leads to a low signal-to-noise power ratio and possibly may increase nonlinear distortions. These problems can be circumvented by dispersing the use-signal in the modifying element and thus reduce its peak to average ratio. The dispersing can be digitally fully reversed and thus has no negative effect on the digital use-signal
7. Same arguments as for point 2 apply. However instead of adding a stitching signal, the stitching signal can be generated by appropriate modulation of the use-signal.

As used herein, the term "stitching signal" refers to a signal that is provided by a separate stitching signal source, or that is provided by a stitching signal source that derived from the reference signal source, or that is provided by the same physical source that also provides the reference signal. In some embodiments, the stitching signal may be phase-locked to certain signal components generated by the reference signal source, e.g., by means of any type of feedback or control circuit. The purpose of the stitching signal is to ensure that the at least one model parameter of the measurement system can be well determined without restricting the class of use signals that can be detected.

In a further embodiment the modifying element modifies the use-signal by one or more of the following exemplary operations:

a. adding a stitching signal to the use-signal, or
b. converting the use-signal.

The modifications mentioned above, and in particular the use of a high-speed electro-optic modulator for converting the use signal to an optical carrier frequency, are of particular interest, as they allow to build a broadband analog-to-digital converter with an acquisition bandwidth far beyond those of the individual acquisition elements, by exploiting an arbitrary waveform measurement system for optical signals and a high-speed converter which first converts the electrical signal to an optical signal. In this context, the term analog-to-digital converter refers to a measurement system that translates electrical input signals into digital data.

In a further embodiment, a reconstructed digital input signal is derived from the reconstructed digital use-signal by at least partially removing the modification introduced by the modifying element. Wherein the terms reconstructed digital input-signal and digital input-signal are used herein interchangeably.

As in some embodiments the use-signal is modified by the modifying element before detection, it can be desirable to digitally remove the modification after reconstruction of the use-signal.

In a further embodiment the use-signal and the reference signal have a center frequency in the ultra-violet, visible, or infrared optical frequency ranges, which comprise frequencies between 30 PHz and 700 THz, 400 THz and 700 THz, and between 300 GHz and 400 THz, respectively. However, other frequency ranges, e.g., in the radio-frequency, microwave or millimeter-wave spectrum are also possible.

To use the benefit of potentially large optical bandwidth, the optical frequency range mentioned above is feasible and suitable to implement the measurement system. As used herein, the term "center frequency" means that signals with spectral components a the frequency band of bandwidth B around $f_c$ can be measured, where B is the bandwidth of the measurement system and $f_c$ the center frequency.

In a further embodiment, the use-signal and the reference signal have a center frequency in the range between 150 THz and 250 THz.

In this case, the measurement system can rely on widely available photonic components that have been developed for optical communications in the near-IR spectrum.

In a further embodiment, the M discrete tones of the reference signal are equidistant in frequency and derived from an optical frequency comb.

Optical frequency combs have shown to provide low noise signals with a timing jitter that is comparable [17] or even better [18] than the timing jitter of electronic oscillators. Examples for optical frequency combs are, without limitation:

- soliton comb generators, e.g., dissipative Kerr soliton (DKS) comb sources
- mode locked laser, e.g., mode-locked laser diodes, fiber lasers, or solid-state lasers,
- gain-switched lasers,
- comb sources that rely on injection locking,
- or frequency comb sources that rely on electro-optic modulators, or
- frequency comb sources that contain third-order nonlinear optical fibers or waveguides for spectral broadening.

To isolate M tones out of potentially many comb lines, additional filter elements are optionally part of reference signal source. As used herein the term "derived from" means that the reference signal could be an optical frequency comb or an optical frequency comb that is optimized for the application by shaping its spectrum or amplifying and removing certain spectral components.

Considering current state-of-the art technology, The M discrete tones of the reference signal preferably have a free spectral range between 100 MHz and 500 GHz, more preferably between 1 GHz and 200 GHz, and most preferably between 10 GHz and 100 GHz. The latter frequency range is of particular interest as a corresponding system would depend on mixing and acquisition elements that have at least a bandwidth of 5 GHz to 50 GHz. Such elements (e.g. photodetectors and analog-to-digital converters) are readily available today. A reference signal with a free spectral range up to 200 GHz and above is also of interest as high-speed photodetectors and analog-to-digital converters up to 100 GHz are expensive, but still available today. Even more broadband components may become available in the future, and the preferred frequency ranges might shift accordingly. A reference signal with a free spectral range between 1 GHz to 10 GHz is also of interest as only low speed analog-to-digital converters are required. This can reduce the price and increase the measurement fidelity at the cost of bandwidth.

In a further embodiment, the reference signal consists of equidistant spectral tones, which correspond to a regular train of optical pulses in the time domain, where adjacent pulses may overlap in time. By relying on an accurate frequency domain system model, overlapping time domain pulses of the reference signal do not pose a problem to the measurement system described here, as long as the spectral tones are stable and cover the bandwidth of the use-signal. In fact, having a lower peak-to-average power ratio of the reference signal may reduce the effect of nonlinearities and improve the measurement fidelity.

In a further embodiment, the at least one model parameter estimated by means of the redundant information comprised in the total number of all partial mixing signals is related to a property of the partial reference signal either in absolute terms or relative from one tone of the reference signal to another tone of the reference signal, a property of an optical or electrical circuit either in absolute terms or relative to another circuit.

Intrinsic properties of the partial reference signal may comprise, without limitation:

- amplitude,
- phase,
- frequency,
- polarization, and
- free spectral range, wherein some of these intrinsic properties can refer to each of the M tones of the reference signal individually, e.g., amplitude, phase, and frequency.

Intrinsic properties of the optical or electrical circuit may comprise, without limitation,

- amplitude changes,
- phase changes, or
- polarization changes,
- group delay,
- dispersion, experienced by a signal that travels through a certain path of the circuit. These paths might be different for different signals, e.g., the phase and/or amplitude of the partial use signals and the partial reference signal is distorted in all N channels independently.

In a further embodiment the system model comprises the amplitude and/or phase of frequency-dependent transfer functions of the whole system or parts of the system such as splitting elements, waveguides, coupling interfaces, optical paths, amplifiers, polarization beam splitters, phase shifters, filters, demulitplexers, optoelectronic receivers, reference signal pulse shape, the amplitude and phase of the reference tones.

By obtaining the system transfer functions during a one-time calibration procedure, the effects of the components mentioned above can be digitally compensated and the digital use-signal can be accurately reconstructed. If the model or calibration is inaccurate, the signal-to-noise-and-distortion ratio of the digital use signal will be reduced.

In a further embodiment the system is characterized in a dedicated calibration measurement with a known electromagnetic waveform referred to as calibration signal that is provided by a calibration signal source.

As used herein, the term "calibration signal" refers to known signal that can be used to retrieve all transfer functions of the measurement system that are part of the system model. The calibration signal preferably covers the majority of the entire spectral range within which the electromagnetic use signal or a modified version thereof shall be detected. In a specific embodiment, the calibration signal is derived from a tunable and/or broadband signal source. More than one calibration signal source might be used in parallel or sequentially to determine all model parameters. An example for a calibration signal is an optical frequency comb with a known pulse shape and an appropriate free spectral range, e.g., in the MHz or GHz region.

In a further embodiment the calibration signal is a broadband optical frequency comb with a free spectral range below 25 GHz, or below 10 GHz, or below 5 GHz, or below 1 GHz, or below 500 MHz, or below 100 MHz.

The use of a broadband optical frequency comb as calibration signal has several advantages. First, there exist very stable and broadband optical frequency combs that can be pre-characterized with, e.g., with frequency-resolved optical gating (FROG) or equivalent optical techniques. Moreover, the use of a broadband optical frequency comb allows to characterize the system with a single measurement. If the free spectral range (FSR) is chosen appropriately, then the mixing products of the calibration signal with the individual reference signal tones do not overlap in frequency domain and can thus be separated (see FIG. 18 for a specific example). To further improve the signal-to-noise ratio, it might be beneficial to average many calibration measurements or use a dispersed optical frequency comb as calibration signal. The latter operation can reduce the peak-to-average power ratio of the calibration signal and therefore reduce the impact of nonlinearities and noise added by the acquisition elements.

A low free spectral range of the calibration signal in the low GHz region or in the MHz region or in the kHz region allows to characterize the system with a high frequency resolution in a single measurement. As used above, the term "broadband" means the calibration frequency comb covers the whole or a substantial part of the detection bandwidth of the measurement system.

In a further embodiment, each mixing element has K=2 outputs, which are connected to the inputs of K=2 associated acquisition elements, each comprising an analog-to-digital converter.

With K=2 or more outputs per mixing elements it is possible to measure the partial use-signal against multiple reference phases and thus reconstruct the field amplitude and the corresponding phase, which may be expressed by the complex-valued field amplitude. An example for such a mixing element is an inphase/quadrature (IQ) receiver, based, e.g., on an 90° optical hybrid and a subsequent pair of balanced photodiodes. Alternatively, other implementations such as 3×3 multi-mode interference couplers (MMI) with subsequent photodiodes are also possible.

In a further embodiment, the effective number of bits (ENOB) of each of the acquisition elements is better than 4 bit, more preferably better than 5 bit and most preferably better than 6 bit or 7 bit. The analog bandwidth in which such ENOB of the individual acquisition element is obtained is preferably higher than 5 GHz, more preferably higher than 10 GHz, and most preferably higher than 20 GHz or 30 GHz. By using acquisition elements with high ENOB, the measurement fidelity is increased. However, high-bandwidth acquisition elements usually have a lower ENOB than acquisition elements with a lower bandwidth. Thus, a system with many low-bandwidth high ENOB acquisition elements may have a better measurement fidelity than a system with few high bandwidth low ENOB acquisition elements.

In a further embodiment the signal-to-noise-and-distortion ratio (SINAD) of a reconstructed full-scale sinusoidal test signal exceeds 32 dB for an acquisition bandwidth of at least 90 GHz. Note that for such a signal the effective number of bits ENOB is then related to the SINAD by $$ENOB = \frac{SINAD_{dB}}{6.02} - 0.29. \tag{2}$$

The state-of the art electronic analog-to-digital converters reach a bandwidth of 110 GHz with 5 ENOB [19]. The measurement system described in this invention has the potential to overcome this limitation by parallelizing multiple low bandwidth high ENOB ADCs.

In a further embodiment, the signal-to-noise-and-distortion ratio (SINAD) of a reconstructed full-scale sinusoidal test signal exceeds 25 dB for an acquisition bandwidth of at least 290 GHz In a further embodiment the signal-to-noise-and-distortion ratio (SINAD) of a reconstructed full-scale sinusoidal test signal exceeds 20 dB for an acquisition bandwidth of at least 490 GHz.

In a further embodiment the signal-to-noise-and-distortion ratio (SINAD) of a reconstructed full-scale sinusoidal test signal exceeds 15 dB for an acquisition bandwidth of at least 1.9 THz. Note that due to the scalability of the measurement system the total bandwidth can be scaled up above the limitation of single high-speed analog-to-digital converters.

A embodiment of a measurement system for operating one of the previously described methods, comprising:

a. an input interface
b. an electromagnetic reference signal source and
c. a subsystem, comprising:
  i. a first splitting element,
  ii. a second splitting element,
  i. N mixing elements, wherein the $n^{th}$ mixing element generates $K_n$ partial mixing signals
  iii. a number of $$\sum_{n=1}^{N} K_n$$

corresponding acquisition elements, and
  iv. a digital signal processor, wherein:

d. the input interface is coupled to the first splitting element,
e. the electromagnetic reference signal source is coupled to the second splitting element,
f. the n-th output of the first splitting element is coupled to the n-th mixing element,
g. the n-th output of the second splitting element is coupled to the n-th mixing element,
b. each of the $K_n$ outputs of the n-th mixing element is coupled to one of the $$\sum_{n=1}^{N} K_n$$

corresponding acquisition elements, c. each acquisition element is coupled to the digital signal processor, characterized in that:

h. at least one partial reference signal comprises at least two spectral tones, i. the totality of all partial mixing signals comprises redundant information, and j. the digital signal processor is configured to extract at least one model parameter of the measurement system from the redundant information.

The term "is coupled to" herein describes a connection between different elements. Such a connection could be realized for example by:

optical or electrical waveguides, optical fibers or electrical cables, optical or electrical wire bonds, or free space links, optionally comprising focusing elements, reflectors, antennae, or similar components.

In a further embodiment of said device the mixing element comprises one or more detection elements, wherein examples for detection elements are a photodetector, a rectifier, nonlinear elements such as diodes, transistors or other devices with nonlinear signal-transfer characteristics, nonlinear optical elements, exploiting, e.g., second- or third-order optical nonlinearities, a bolometer, or similar devices.

In a further embodiment of said device, the mixing element comprises one or more combining elements, wherein a combining element superimposes two or more signals. Examples for combining elements are:

a directional coupler, a multi-mode interference coupler, and/or a 90° optical hybrid, an active or passive electronic circuit designed for superimposing two or more signals.

In a further embodiment of said device, the mixing element is embodied by a 90° hybrid followed by a pair of balanced photodetectors. The mixing element thus represents a coherent receiver that can measure in-phase and quadrature-phase components and therefore the full optical field.

In a further embodiment of the previously described device the mixing element comprises a microwave mixer. Said embodiment works directly with microwave signals and therefore can avoid issues associated with optical signals, e.g., optical phase drifts.

In a further embodiment of the previously described measurement system, all acquisition elements and the analog-to-digital converts used within all acquisition elements are synchronized in such a way that the temporal relationship between all digitized partial mixing signals is known.

The synchronization of all acquisition elements is required to determine the temporal alignment of the digitized partial mixing signals, which facilitates the reconstruction of the digital use-signal.

In a further embodiment, the first and second splitting elements are implemented as power splitters in conjunction with distinct path delays. The advantage of using power splitters as splitting elements is the compact, passive, and simple hardware that is robust with respect to fabrication tolerances and environmental influences and that does not need any active control. Power splitters can be compactly fabricated also in high-index-contrast integration platforms such as indium phosphide (InP) or silicon photonics.

In a further embodiment the ENOB of the measurement system is at most 1 bit lower than the ENOB of a single acquisition element. Ideally the ENOB of the measurement system is the same as the ENOB of the underlying acquisition element. However, practically the ENOB of the measurement system is lower than the ENOB of the underlying acquisition element, because the additional noise and distortions are added, e.g. by the mixing element. An inaccurate system calibration or further distortions arising in the detection system may further reduce the signal quality. Preferably this ENOB (SINAD) penalty is lower than 2 bit (12 dB), more preferably lower than 1 bit (6 dB) and most preferably lower than 0.5 bit (3 dB).

BRIEF DESCRIPTION OF THE FIGURES

Further details and features of the present invention result from the following description of a preferred embodiment, in particular in connection with the dependent claims. Here, the respective features can be realized alone or in combination with each other. The invention is not limited to the embodiment examples or forms.

The examples or forms of embodiment are shown schematically in the following figures. Here, identical reference numerals in the figures designate identical or functionally identical elements or elements corresponding to one another with respect to their functions.

Figure 1:
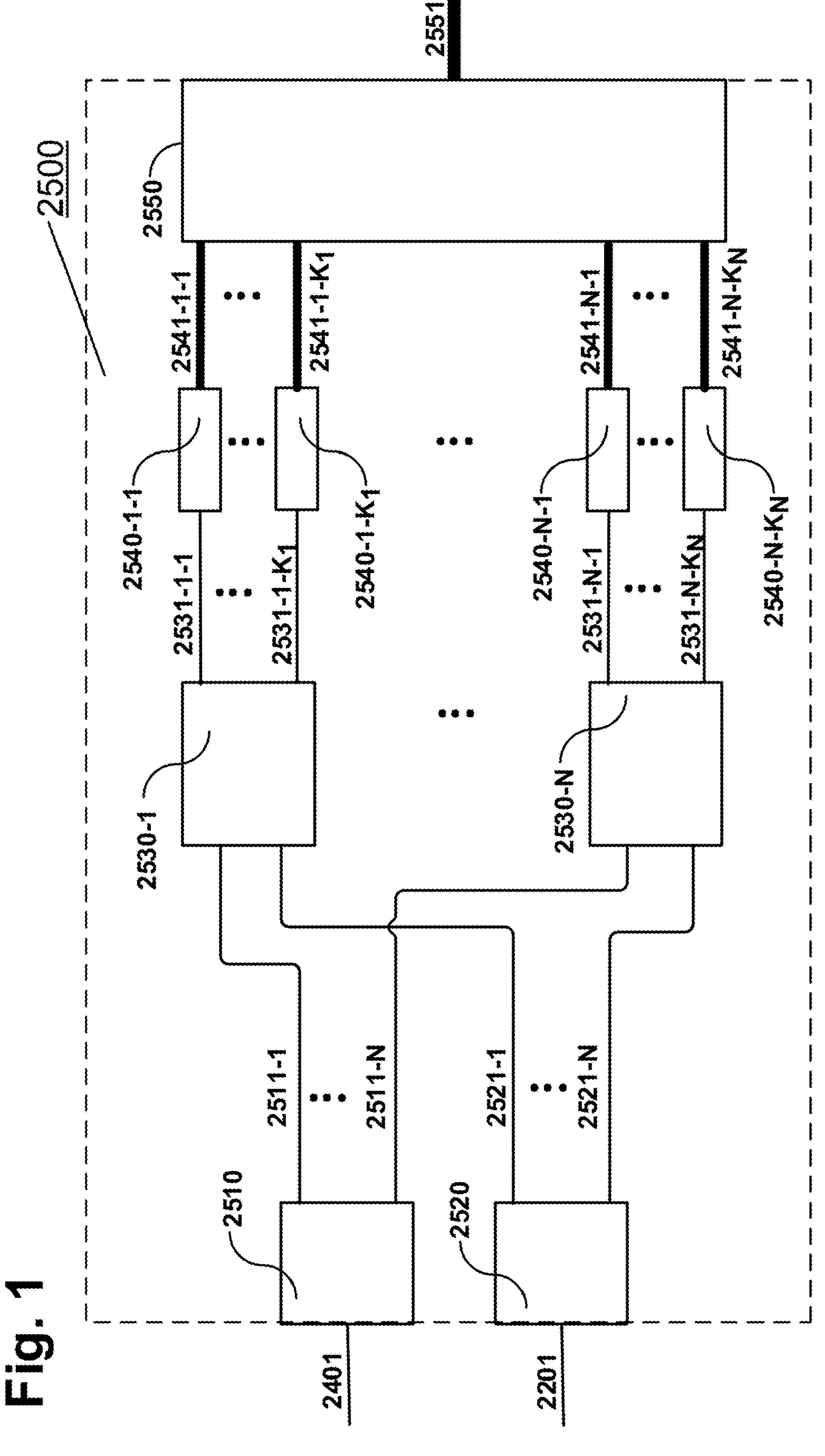
Figure 2:
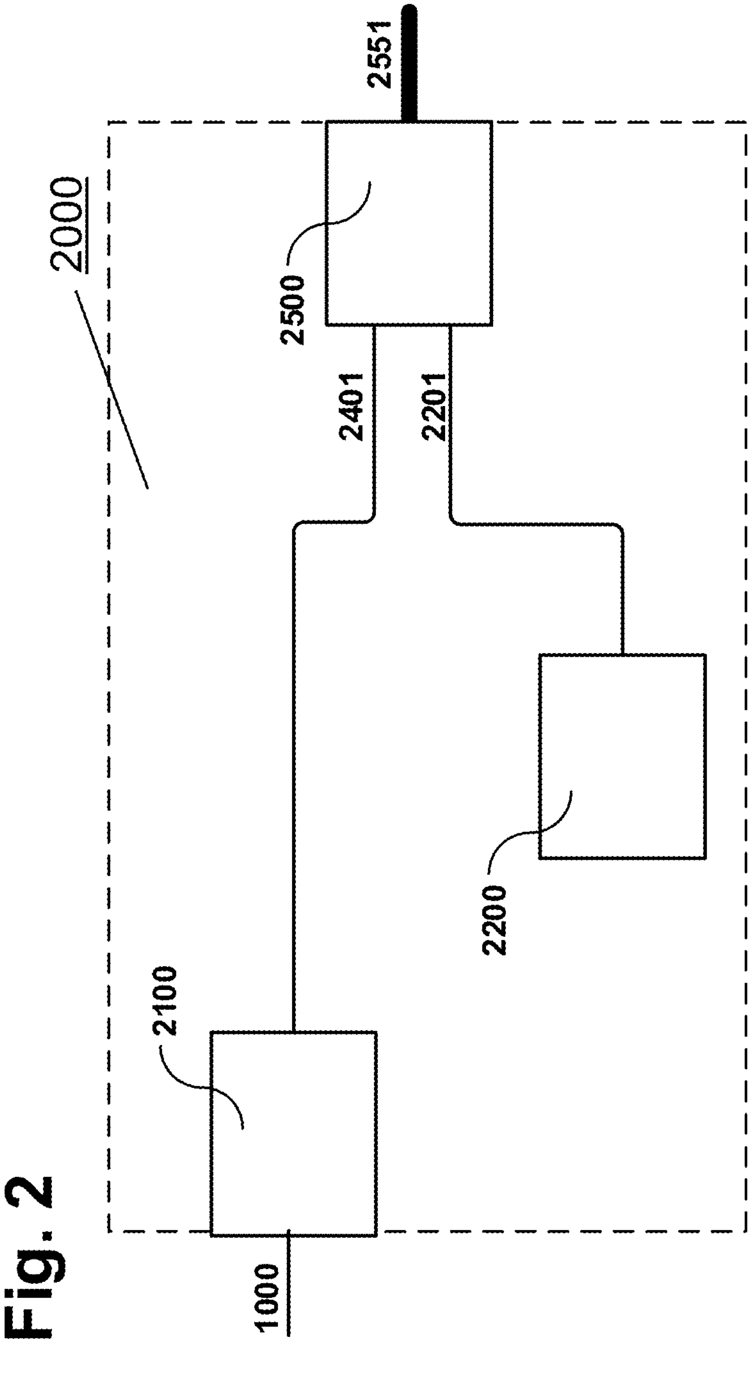
Figure 3:
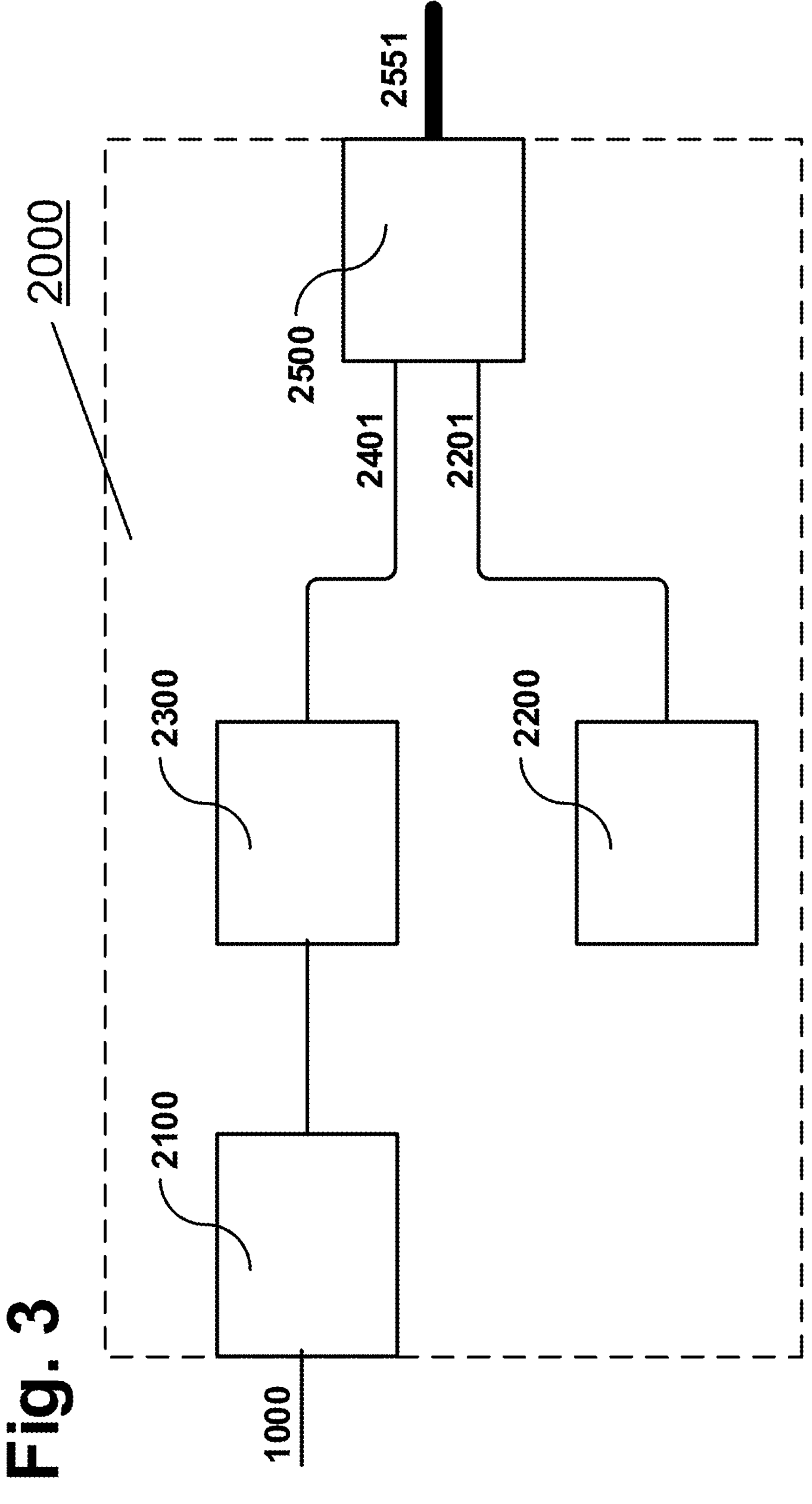
Figure 4:
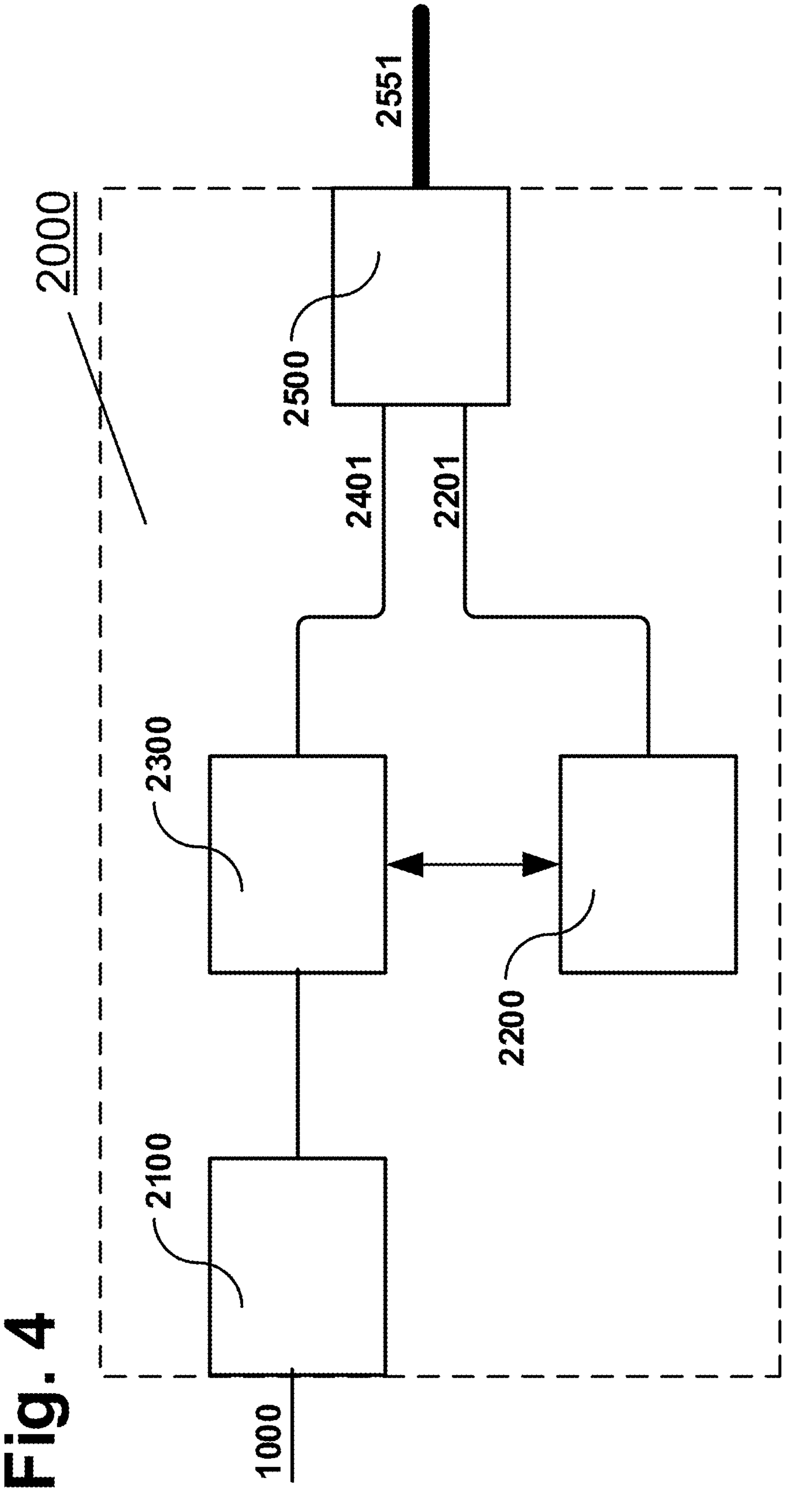
Figure 5:
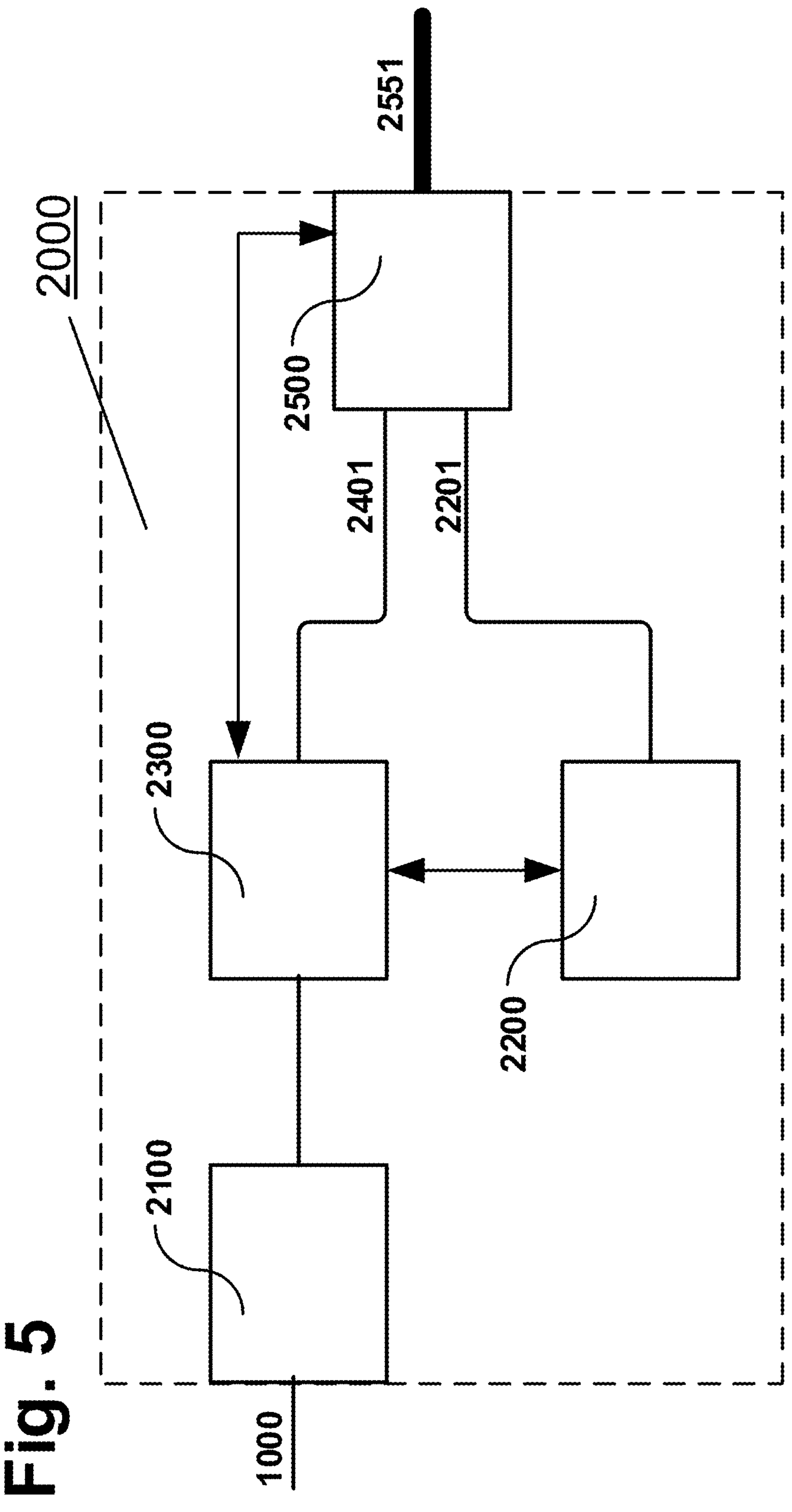
Figure 6:
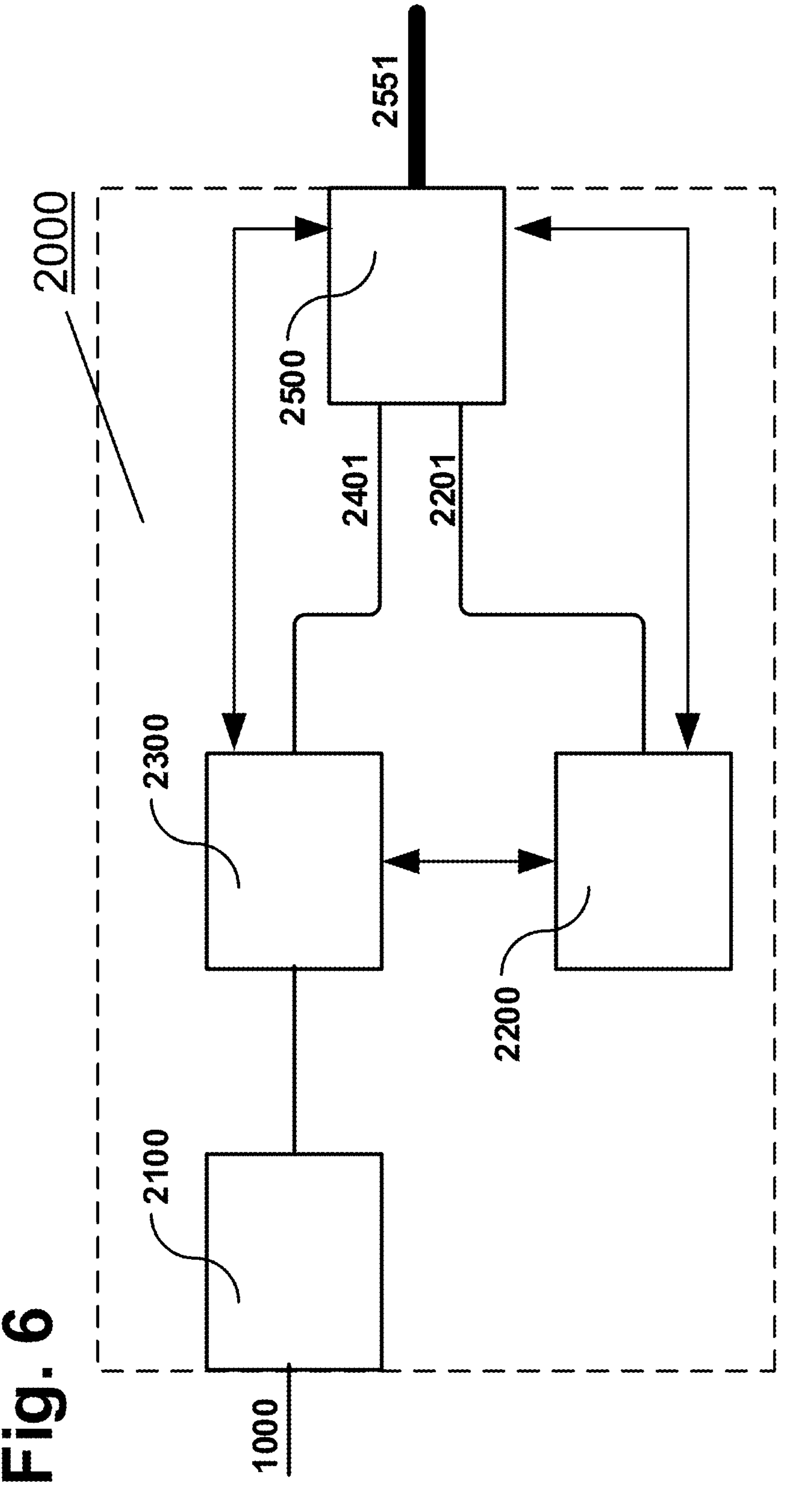
Figure 7:
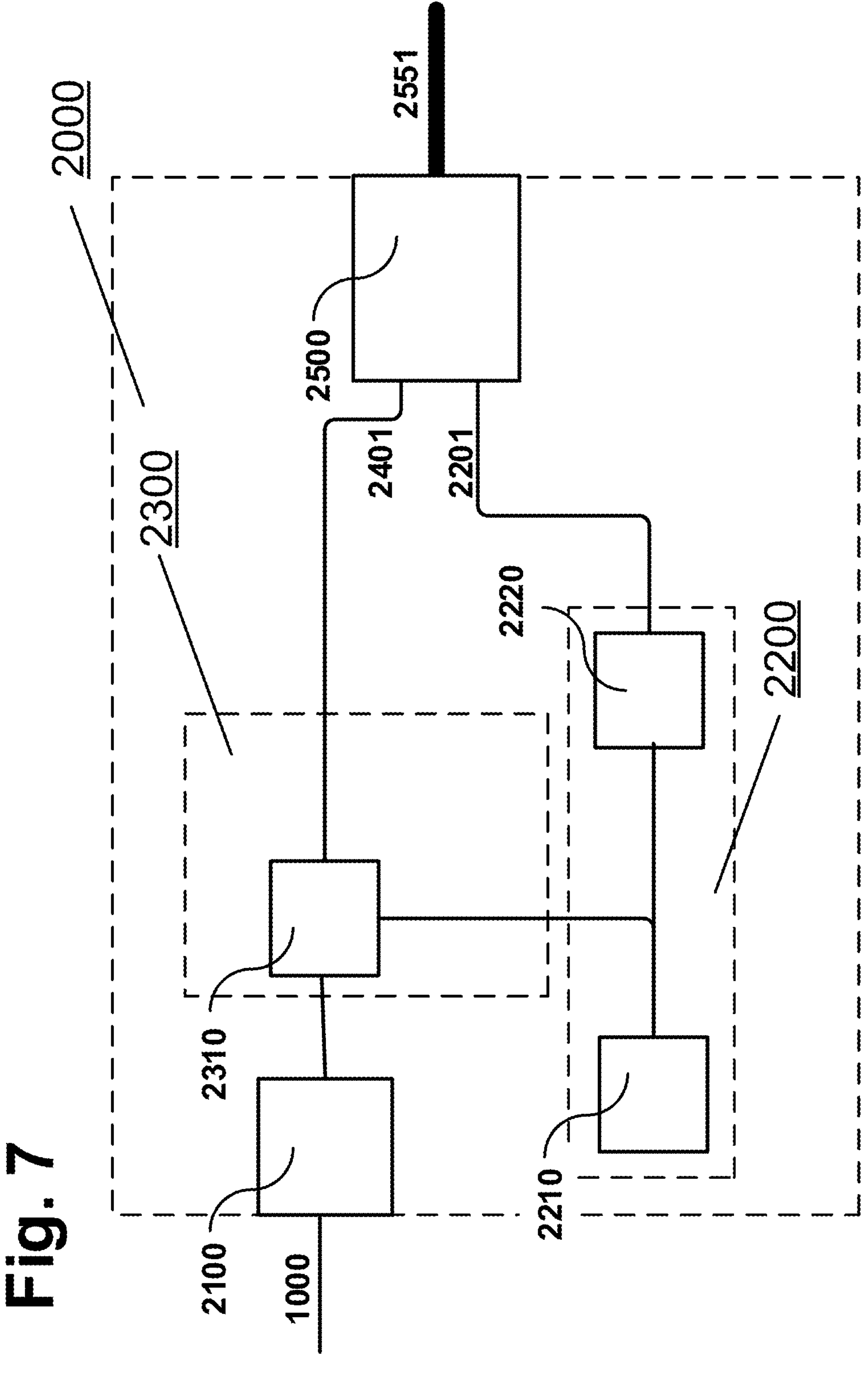
Figure 8:
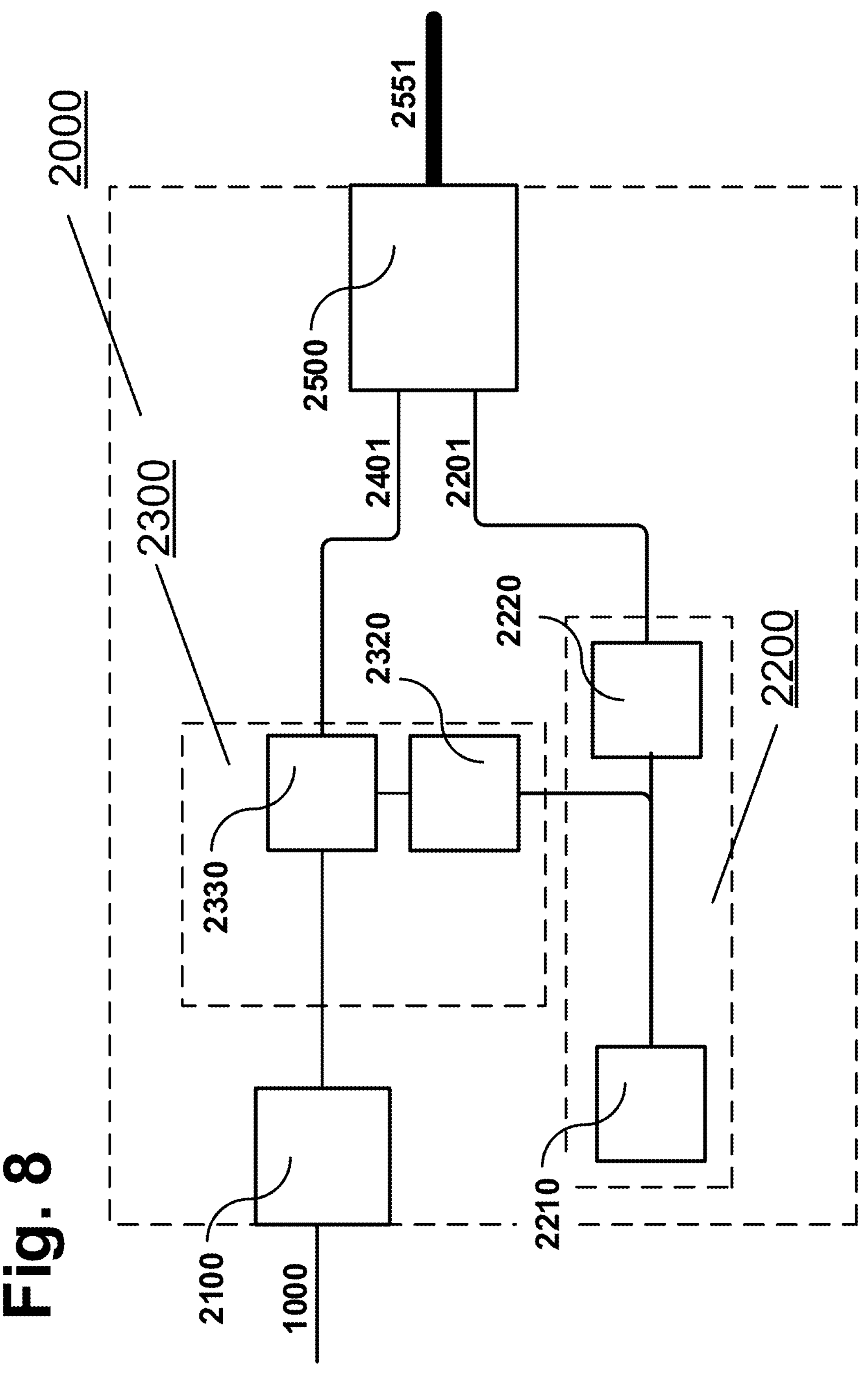
Figure 9:
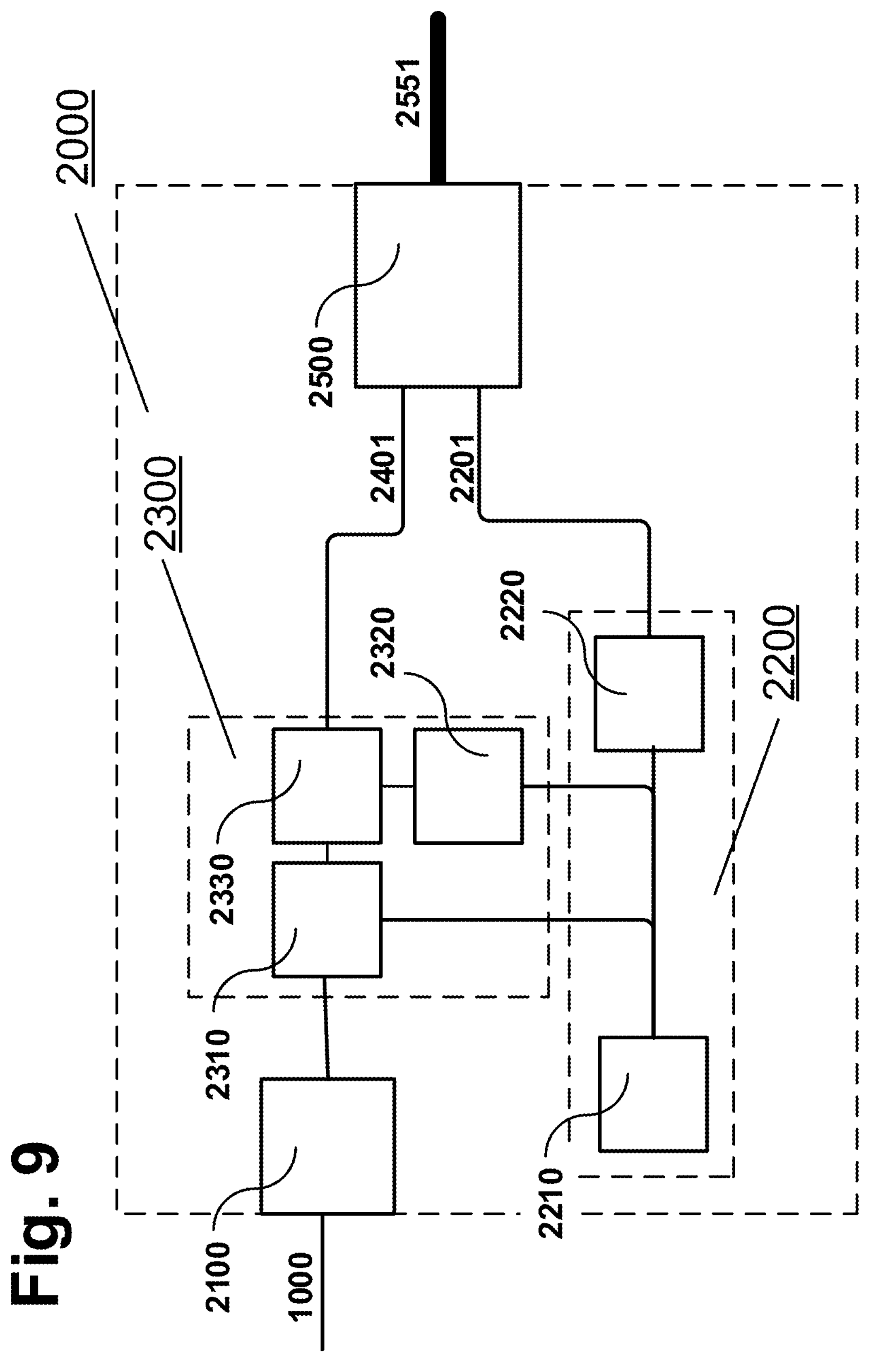
Figure 10:
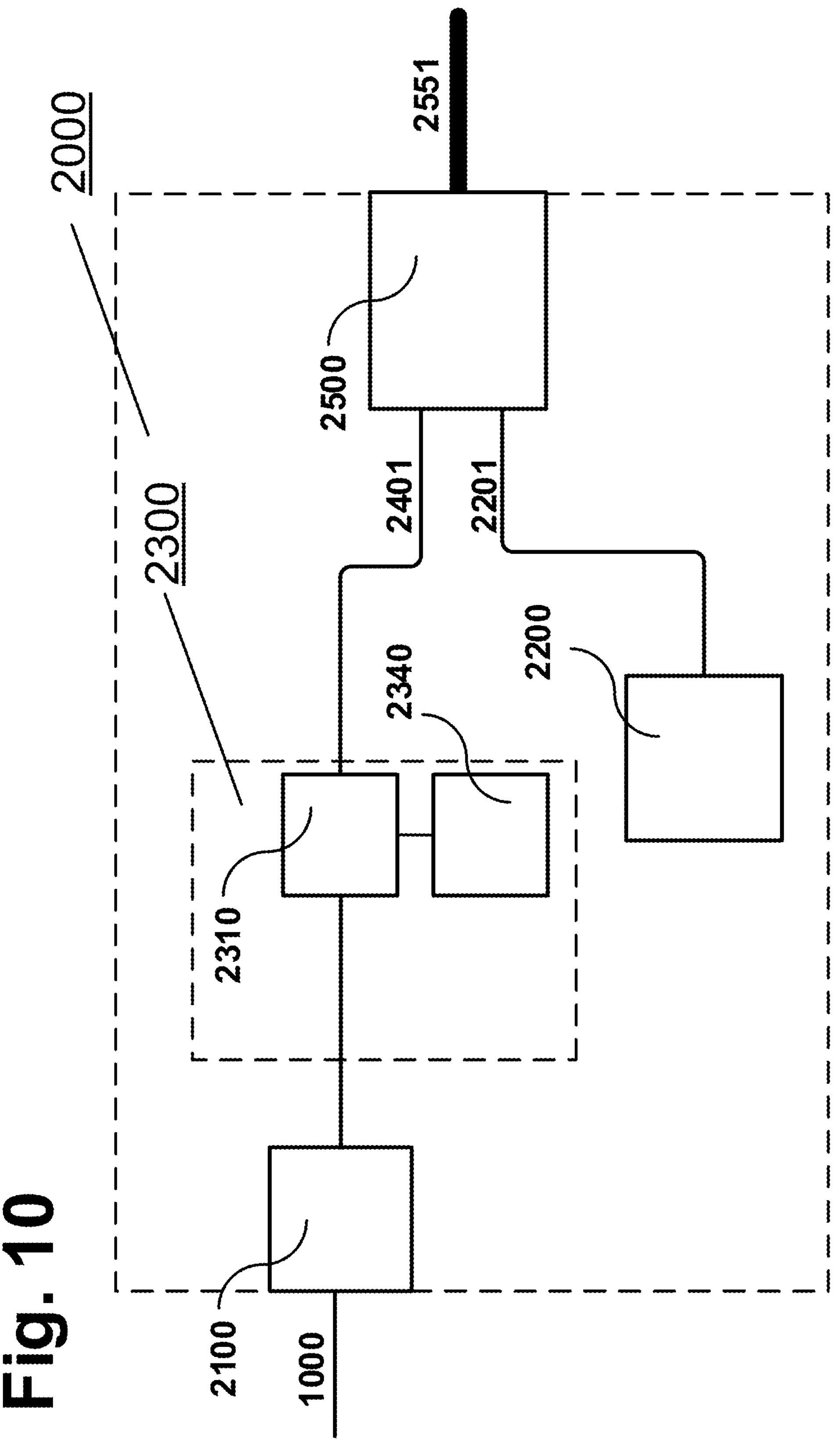
Figure 11:
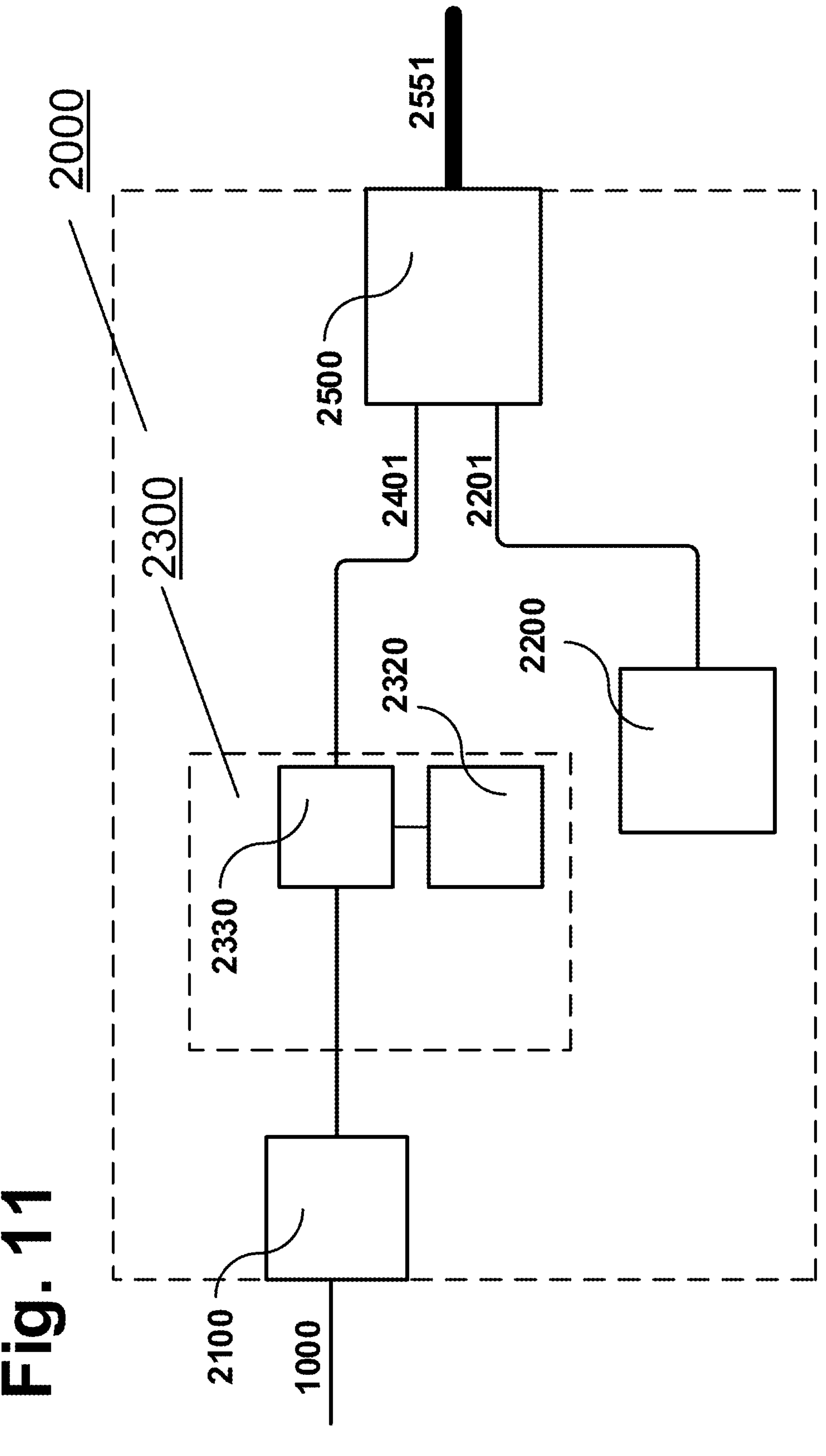
Figure 12:
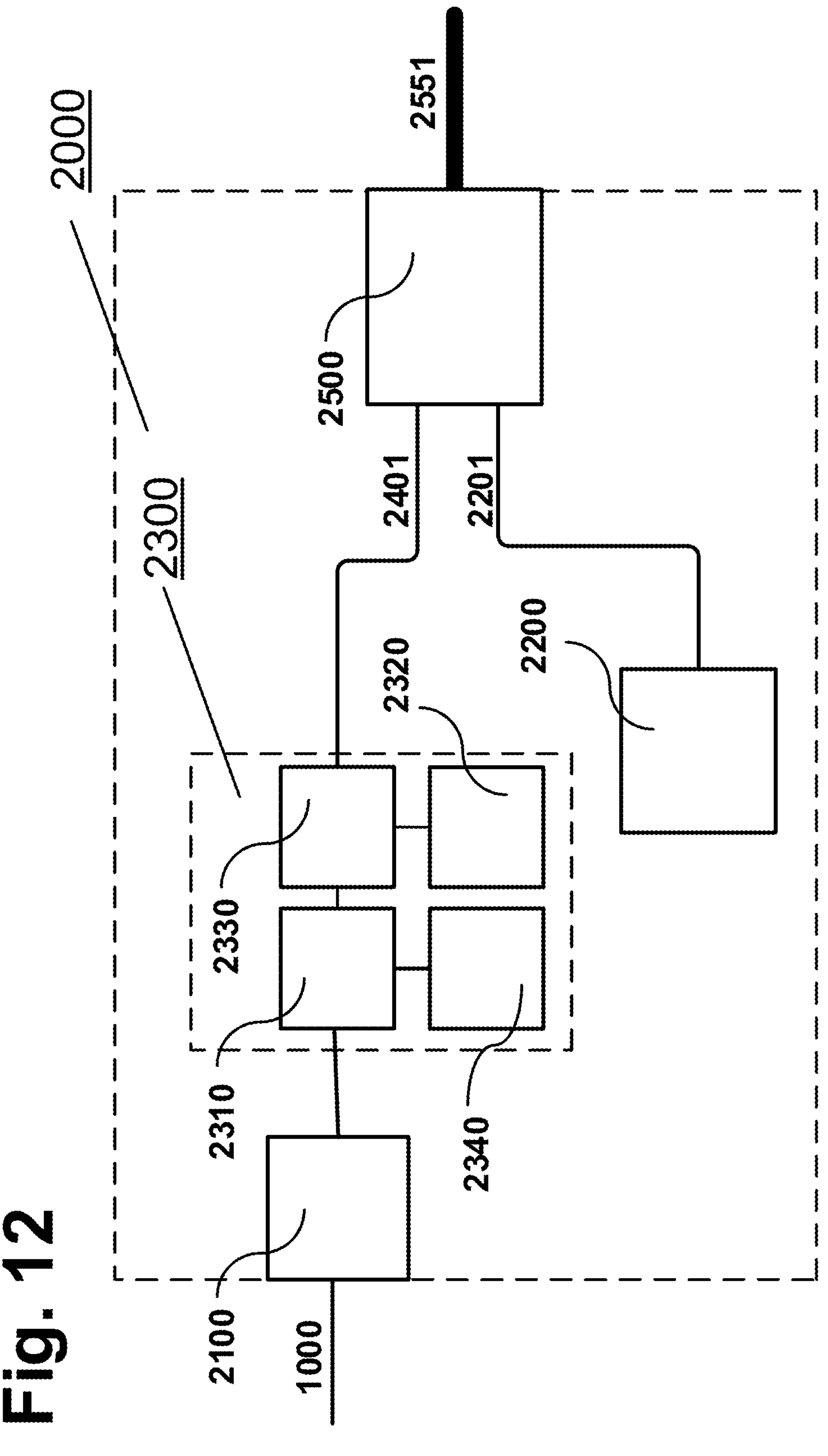
Figure 13:
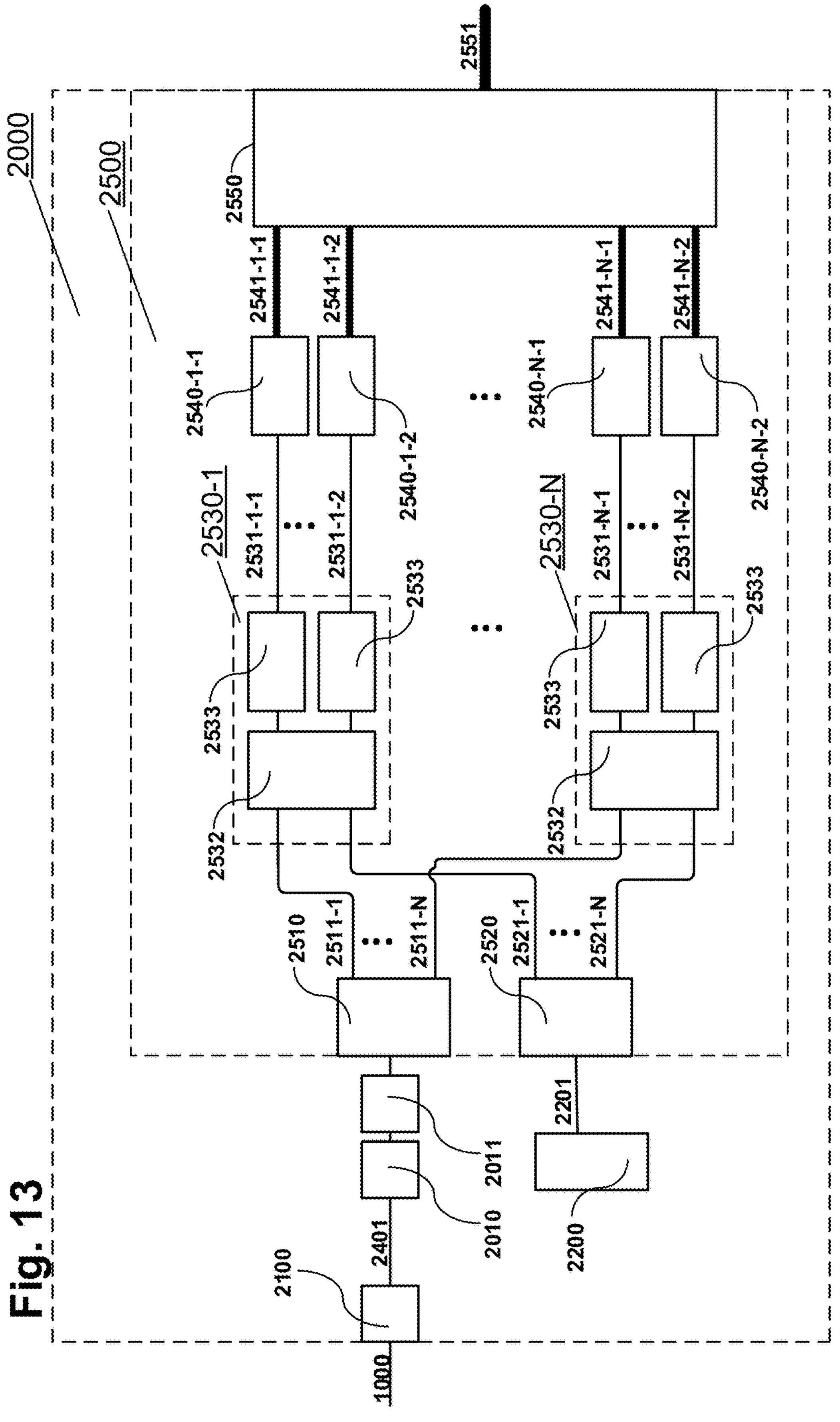
Figure 14:
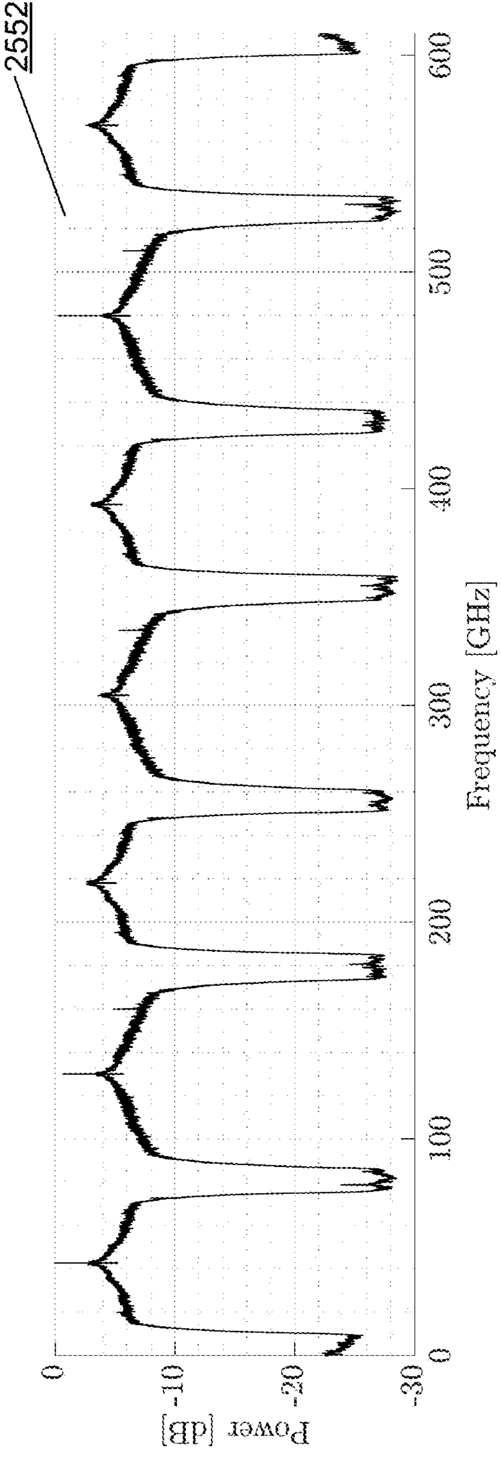
Figure 15:
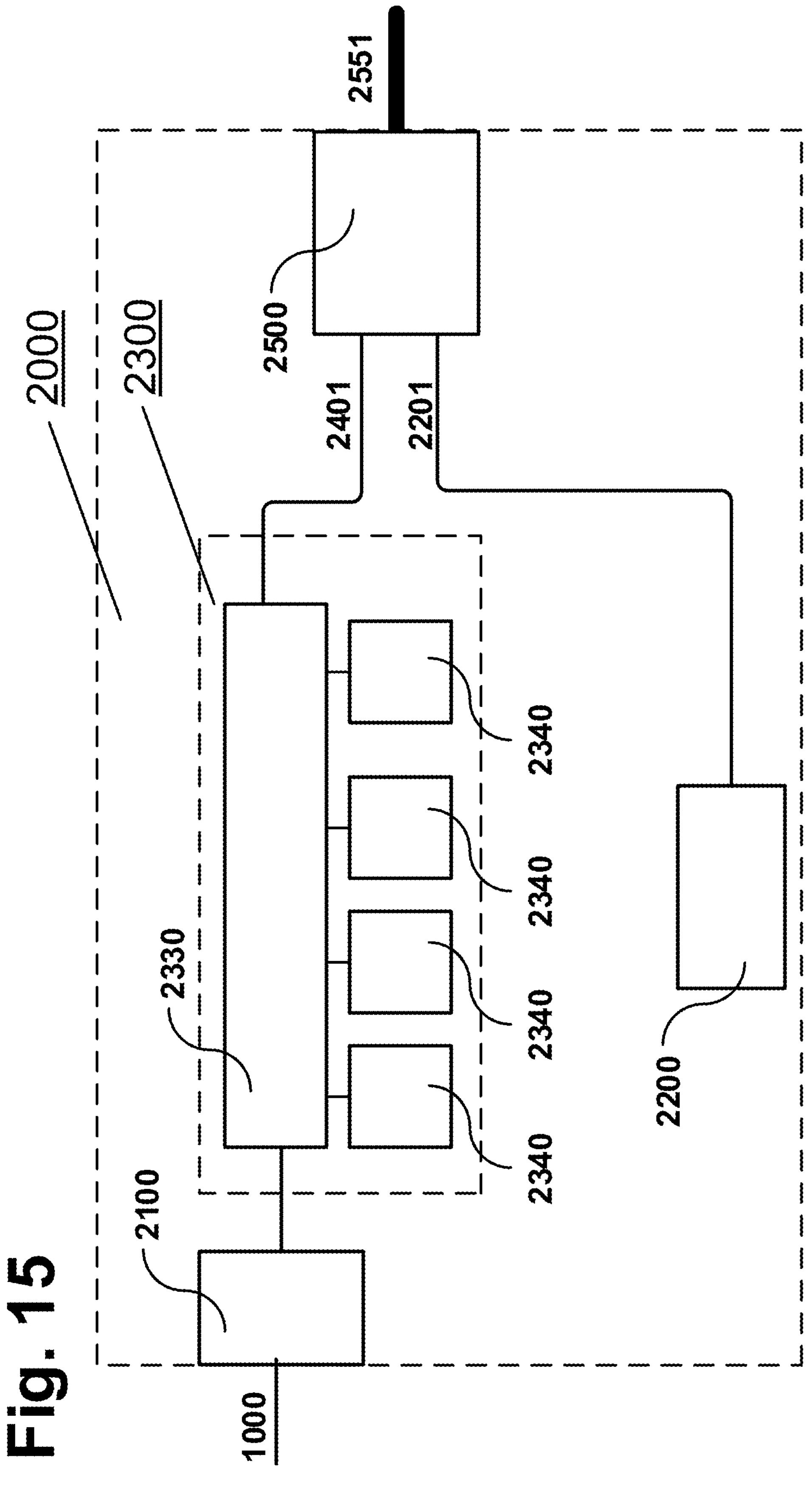
Figure 16:
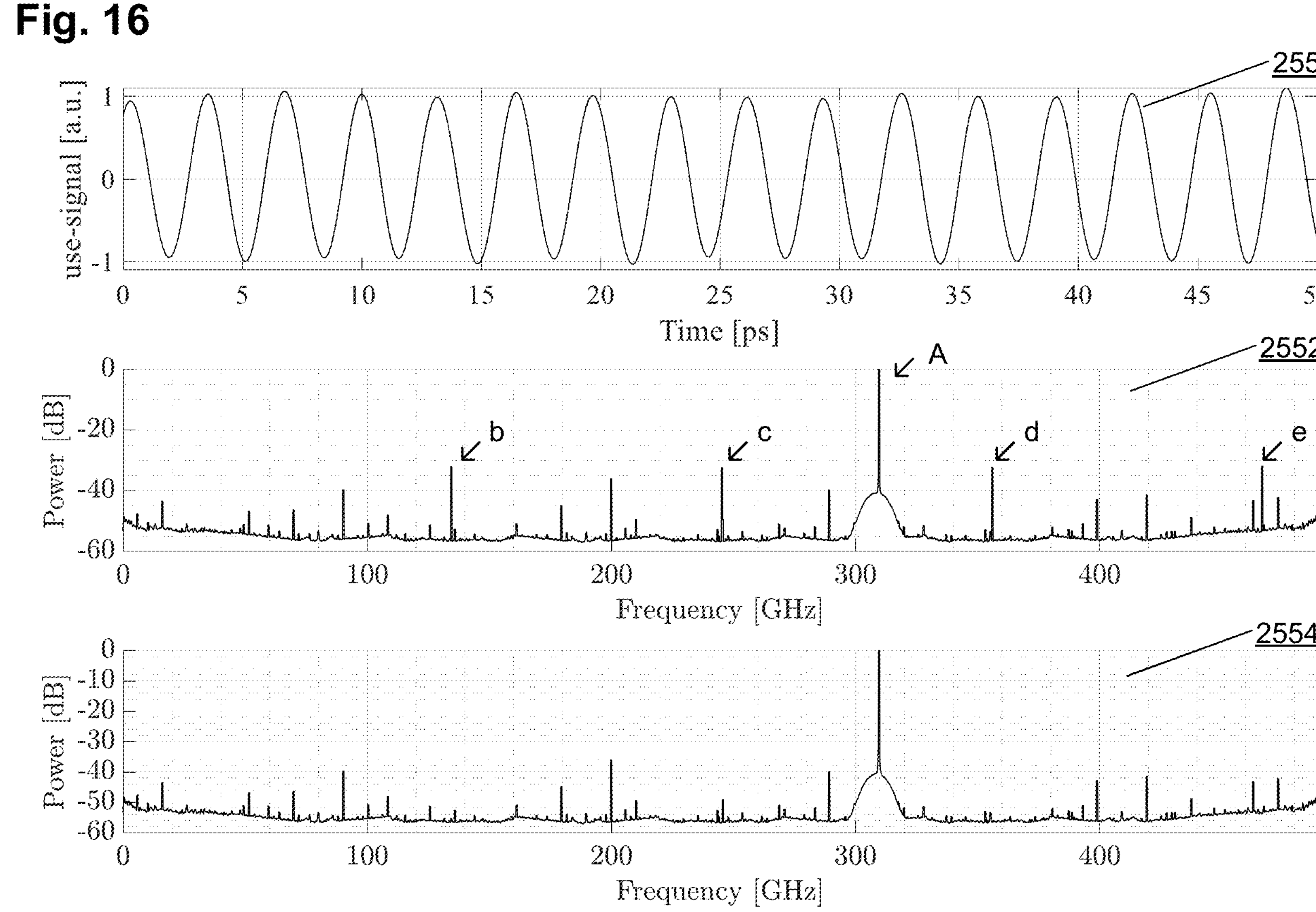
Figure 18:
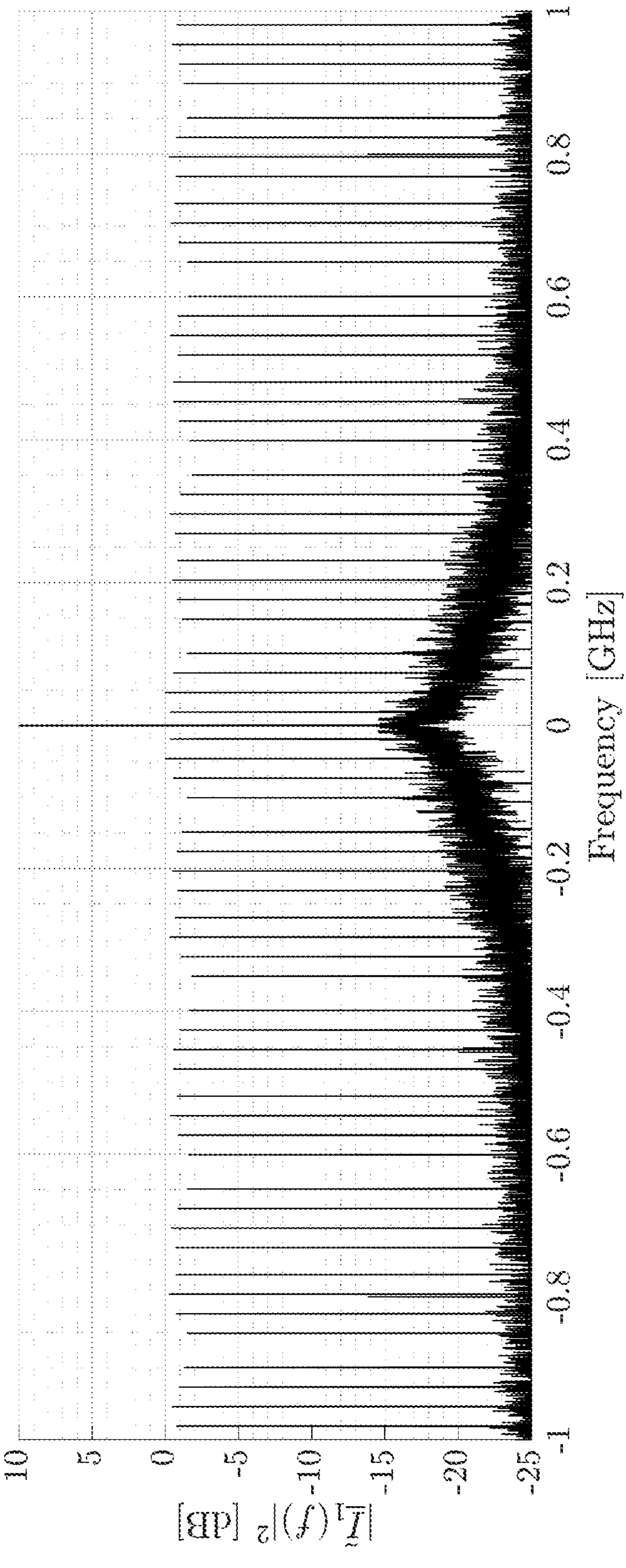
Figure 20:
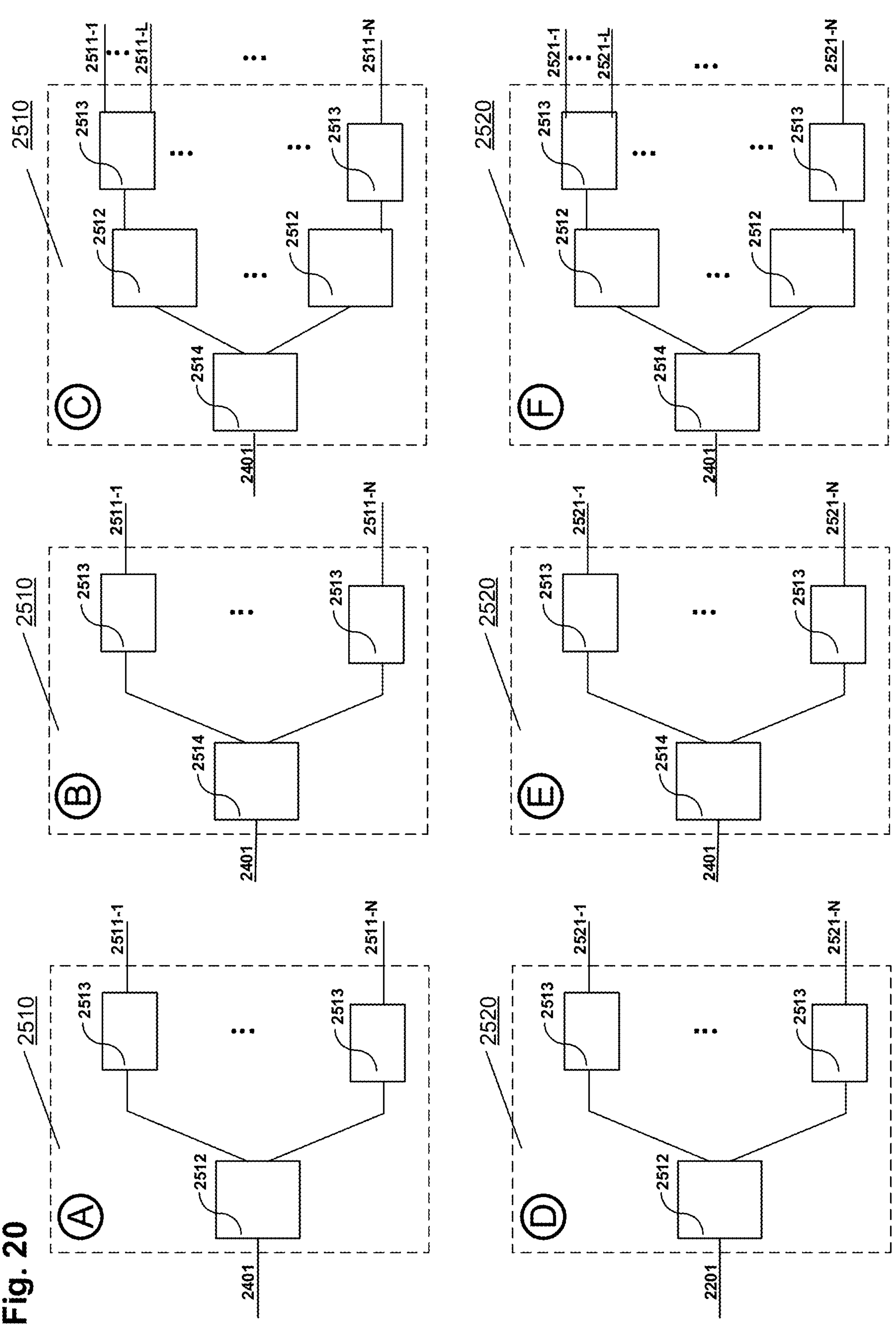
Figure 21:
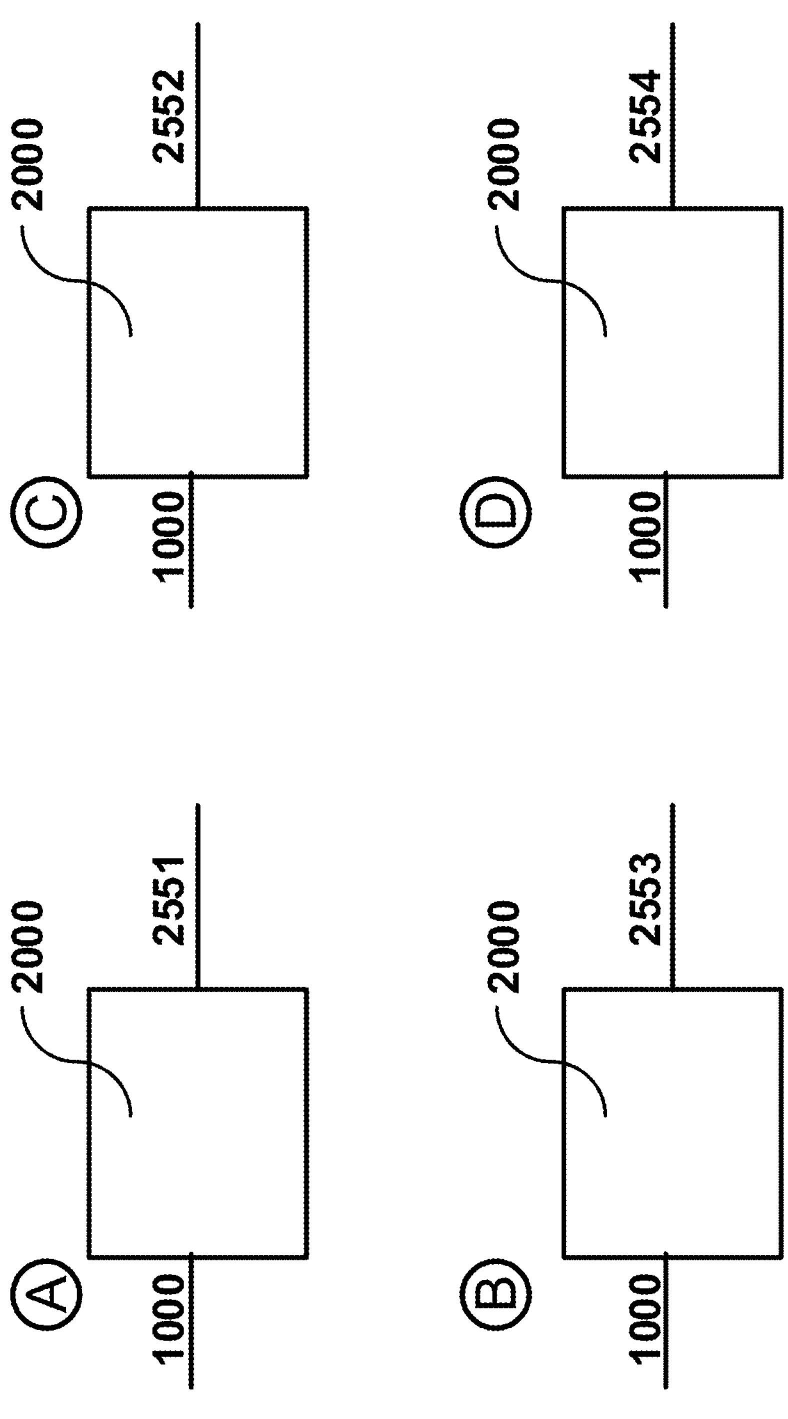

For illustrative purposes and without limiting effect, further features and advantages of the invention result from the description of the accompanying drawings. Therein shows:

FIG. 1 a schematic sketch of a subsystem for a further embodiment of a measurement system for operating a method for detecting an electromagnetic use-signal according to claim 1;

FIG. 2 a schematic sketch of a first embodiment of a measurement system for operating a method for detecting an electromagnetic use-signal according to claim 1;

FIG. 3 a schematic sketch of a further embodiment of a measurement system for operating a method for detecting an electromagnetic use-signal according to claim 4;

FIG. 4 a schematic sketch of a further embodiment of a measurement system for operating a method for detecting an electromagnetic use-signal according to claim 4;

FIG. 5 a schematic sketch of a further embodiment of a measurement system for operating a method for detecting an electromagnetic use-signal according to claim 4;

FIG. 6 a schematic sketch of a further embodiment of a measurement system for operating a method for detecting an electromagnetic use-signal according to claim 4;

FIG. 7 a schematic sketch of a further embodiment of a measurement system for operating a method for detecting an electromagnetic use-signal according to claim 4 or 5;

FIG. 8 a schematic sketch of a further embodiment of a measurement system for operating a method for detecting an electromagnetic use-signal according to claim 4 or 5;

FIG. 9 a schematic sketch of a further embodiment of a measurement system for operating a method for detecting an electromagnetic use-signal according to claim 4 or 5;

FIG. 10 a schematic sketch of a further embodiment of a measurement system for operating a method for detecting an electromagnetic use-signal according to claim 4 or 5;

FIG. 11 a schematic sketch of a further embodiment of a measurement system for operating a method for detecting an electromagnetic use-signal according to claim 4 or 5;

FIG. 12 a schematic sketch of a further embodiment of a measurement system for operating a method for detecting an electromagnetic use-signal according to claim 4 or 5;

FIG. 13 a schematic sketch of a further embodiment of the measurement system;

FIG. 14 an exemplary diagram for a measurement of a 600 GHz broadband optical waveform using the measurement system depicted in FIG. 13;

FIG. 15 a schematic sketch of a further embodiment of the measurement system, comprising the optional modifying element that adds a stitching signal;

FIG. 16 an exemplary diagram for a measurement of a single optical tone using the measurement system depicted in FIG. 15;

Figure 17:
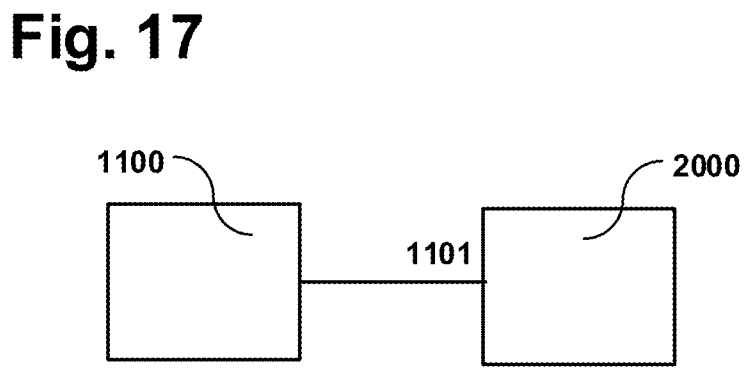

FIG. 17 a schematic sketch for a system setup used for the calibration;

FIG. 18 an exemplary spectrum for a digitized partial mixing signal, that is obtained when measuring a calibration signal according to claim 15;

Figure 19:
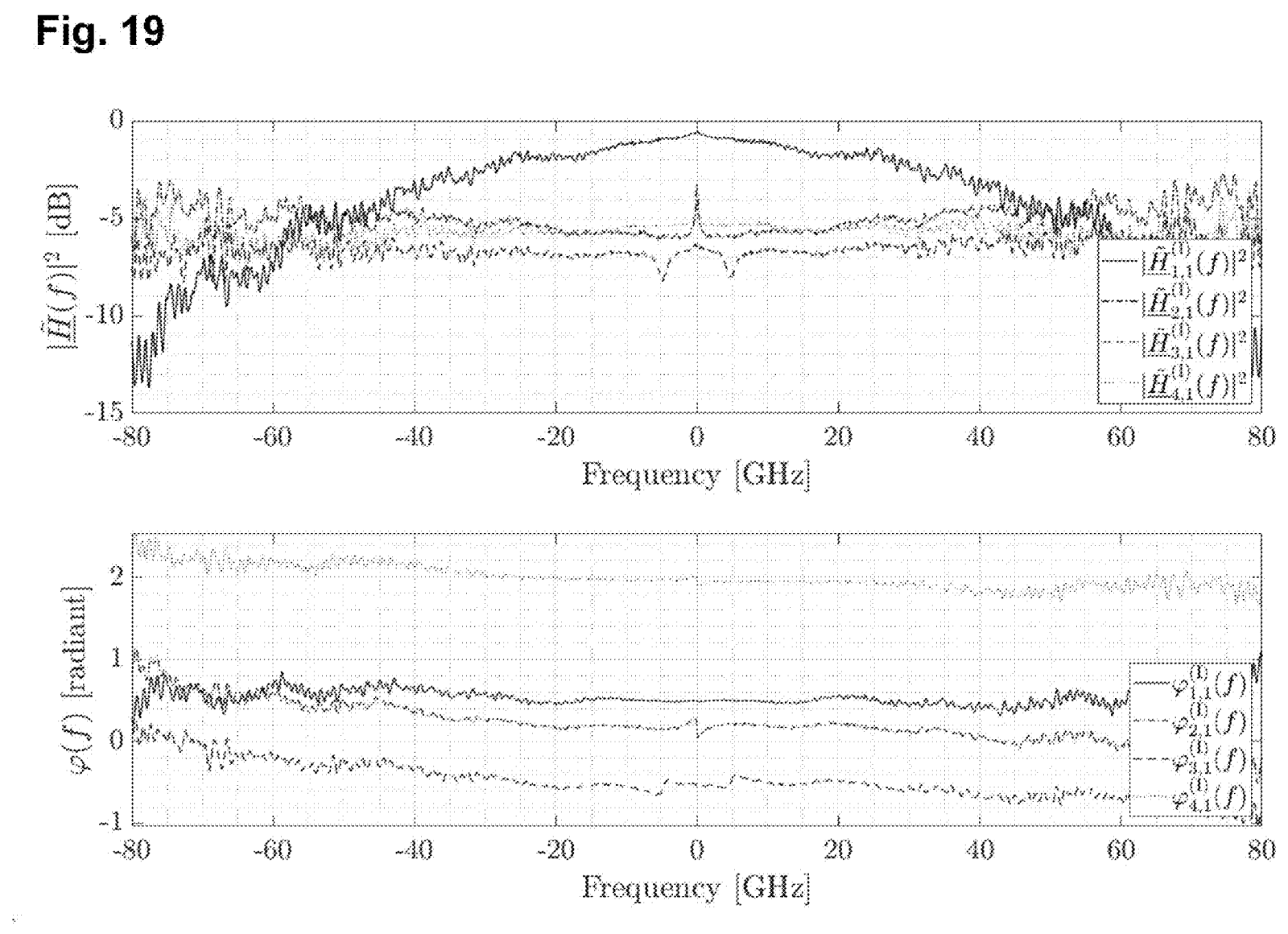

FIG. 19 an exemplary diagram of transfer functions obtained for a further embodiment which is calibrated according to claim 15;

FIG. 20 schematic sketches of further embodiments for the splitting elements; and FIG. 21 schematic sketches of inputs and outputs of further embodiments of the measurement system.

DETAILED DESCRIPTION

FIG. 1 shows the subsystem 2500 that comprises the first 2510 and second 2520 splitting element, N mixing elements 2530, $$\sum_{n=1}^{N} K_n$$

acquisition elements 2540, as well as the digital signal processor 2550. The subsystem 2500 takes the use-signal 2401 and the reference signal 2201 as input and reconstructs the digital use-signal 2551. Digital signals are indicated with bold lines. The use-signal 2401 is split by the first splitting element 2510 into a multitude of N paths, such that the partial use-signals 2511-1 to 2511-N are obtained. The partial reference signal 2201 is split into N paths by the second splitting element 2520 to obtain the N partial reference signals 2521-1 to 2521-N. In the n-th mixing element 2530-*n*, the n-th partial use-signal 2511-*n* is mixed with the n-th partial reference-signal 2521-*n* and $K_n$ partial mixing signals 2531-*n*-1 to 2531-*n*-$K_n$ are generated. In total there are $$\sum_{n=1}^{N} K_n$$

partial mixing signals 2531. All $$\sum_{n=1}^{N} K_n$$

partial mixing signals are digitized with the $$\sum_{n=1}^{N} K_n$$

acquisition elements 2540-1-1 to 2540-N-$K_n$, which comprise at least $$\sum_{n=1}^{N} K_n$$

analog-to-digital converters. The $$\sum_{n=1}^{N} K_n$$

digitized partial mixing signals 2540-1-1 to 2540-N-$K_n$ are passed to the digital signal processor 2550, which reconstructs the digital use-signal 2551 from all $$\sum_{n=1}^{N} K_n$$

digitized partial mixing signals. Note that the index n refers to a distinct mixing element 2530-*n* or subsequently generated signals and can be replaced by any integer in the range from 1 to N.

FIG. 2 shows the measurement system 2000 related to claim 1 and comprises the input interface 2100, the reference signal source 2200 and the subsystem 2500. The electromagnetic input signal 1000 goes through the input interface 2100 and is subsequently referred to as use-signal 2401. The reference signal source 2200 generates the reference signal 2201 which comprises M discrete spectral tones. The subsystem takes the use-signal 2401 and the reference signal 2201 as input and outputs the digitized use-signal 2551. Note that the subsystem 2500, the input interface 2100, and/or the reference signal source 2200 may be merged jointly into a monolithic assembly, in which the different components are integrated together rather than being implemented as separate hardware items.

FIG. 3 shows the measurement system 2000 that, compared to FIG. 2, additionally comprises a modifying element 2300 that can modify the use-signal 2401. Refer to the description of claim 4 for more details on the modifying element.

FIG. 4 shows the measurement system 2000 that, compared to FIG. 3, additionally comprises a connection between the modifying element 2300 and the reference signal source 2200, indicated by a double arrow. This connection indicates that the modifying element 2300 may use information or signal components provided by the reference signal source 2200 or may control parameters such as frequency, phase, or amplitude of the reference signal 2201. Especially this double arrow allows to add a stitching signal to the use-signal 2401 inside the modifying element 2300 that is phase locked to the reference signal 2201, or to shift the use-signal 2401 in frequency by mixing it with a tone that is phase locked to a component of the reference signal 2201.

FIG. 5 shows the measurement system 2000 that, compared to FIG. 4, additionally comprises a connection between the modifying element 2300 and the subsystem 2500, indicated again by a double arrow. This connection allows to exchange information between the modifying element and the subsystem, which can be used to digitally revert the effect of the signal modification performed by the modifying element.

FIG. 6 shows the measurement system 2000 that, compared to FIG. 5, additionally comprises a connection between the reference signal source 2200 and the subsystem 2500. This connection allows to synchronize the acquisition elements inside the subsystem 2500 with the reference signal source 2200, which is again indicated by a double arrow. This connection has the advantage that the number of time-variant model parameters may be reduced. More specifically, the relative time delay from the first sample of a processing block acquired by the acquisition elements to the first pulse of the reference signal becomes obsolete as this time is fixed by a synchronization mechanism.

FIG. 7 shows a further embodiment for the measurement system 2000 depicted in FIG. 4. The reference signal source 2200 comprises a pump source 2210 and an additional reference-signal element 2220 which transforms the output signal of the pump source into the reference signal 2201. The additional reference-signal element 2220 may, e.g., be an electro-optic modulator or any other device based on optical second- or third-order optical nonlinearities, e.g., resonator or a highly nonlinear waveguide or optical fiber. The modifying element 2300 comprises a conversion element 2310 which converts the signal provided by the input interface 2100 to a signal that is in the same frequency range as the reference signal 2201 which provided by the reference signal source 2200. A specific example for the conversion element 2310 is an electro optical modulator that modulates the use-signal provided by the input interface onto the carrier provided by the reference signal source 2200.

FIG. 8 shows a further embodiment for the measurement system 2000 depicted in FIG. 4. The reference signal source 2200 comprises a pump source 2210 and a reference signal element 2220, which transforms the output signal of the pump source into the reference signal 2201. The modifying element 2300 comprises a stitching signal element 2320 and a combining element 2330. The stitching signal element 2320 gets a signal from the reference signal source, which is transforms into the stitching signal, which is then combined by the combining element 2330 with the use-signal obtained from the input interface 2100. FIG. 9 shows a further embodiment for the measurement system 2000 depicted in FIG. 4 that combines the conversion element 2310, as described in FIG. 7 and the stitching signal element 2320 and combining element 2330 as described in FIG. 8 into a single modifying element 2300.

FIG. 10 shows a further embodiment for the measurement system 2000 depicted in FIG. 3 that is similar to the measurement system described in FIG. 7. However, in case of FIG. 10, the modifying element 2300 is independent of the reference signal source and the modifying element comprises a pump source 2340 and a conversion element 2310. This setup can be more flexible compared to the setup in FIG. 7, as the combining element 2300 and the reference signal source 2200 are independent.

FIG. 11 shows a further embodiment for the measurement system 2000 depicted in FIG. 3 that is similar to the measurement system described in FIG. 8. However, in case of FIG. 11, the modifying element 2300 is independent of the reference signal source and the modifying element comprises a stitching-signal element 2320 and a combining element 2330. This setup can be more flexible compared to the setup in FIG. 8, as the combining element 2300 and the reference signal source 2200 are independent.

FIG. 12 shows a further embodiment the measurement system 2000 depicted in FIG. 3 that is similar to the measurement system described in FIG. 9. However, in case of FIG. 12, the modifying element 2300 is independent of the reference signal source and the modifying element comprises a stitching signal element 2320, a combining element 2330, a pump source 2340 and a conversion element 2310. This setup can be more flexible compared to the setup in FIG. 9, as the combining element 2300 and the reference signal source 2200 are independent.

FIG. 13 shows the measurement device 2000 for a further embodiment. In this case, the input signal 1000 is an optical signal in the wavelength range between 1200 nm and 1700 nm such that the implementation can rely on widely available components for optical telecommunications. The use-signal 2401 is provided by the input interface 2100 and optionally amplified by an optical amplifier 2010 and band-pass-filtered by an optical bandpass 2011 for better signal quality before it is coupled to the splitting element 2510 of the subsystem 2500. The reference signal source 2200 provides an optical frequency comb with M discrete tones as optical reference waveform 2201. The first splitting element 2510 splits the use-signal equally into N partial use signals 2511-1 to 2511-N. The second splitting element 2520 splits the reference signal equally into N paths and additionally introduces a time delay $\tau_n$ in the n-th paths to obtain the partial reference signal 2521-*n*, where n=1, . . . N. In a specific embodiment, all time delays $\tau_n$ are different from one another. The mixing elements 2530-1 to 2530-N comprise each a 90° optical hybrid 2532 and two balanced photodetectors 2533 to obtain the partial mixing signals 2531. Each mixing element 2530-*n* outputs two partial mixing signals 2531-*n*-1 and 2531-*n*-2 that correspond to the in-phase and quadrature components of the respective inphase/quadrature (IQ) receiver, where n=1, . . . , N. Each acquisition element 2540-*n*-*k* comprises an analog-to-digital converters 2542. All analog-to-digital converters 2542 work in a synchronized manner. The $$\sum\nolimits_{n=1}^{N} K_n = 2N$$

digitized partial mixing signals 2541-1-1 to 2541-2-N are processed by a digital signal processor 2550, that reconstructs the digital use-signal 2551.

In the following a more detailed system model for the embodiment in FIG. 13 is given. In the following description. Small letters refer to optical signals, capital letters (mostly) refer to baseband signals, underscores indicate complex values, tildes indicate Fourier transformed quantities and primes distinguish between estimated and true values. Note that some symbols using capital letters also capture optical and electrical effects in the baseband. The complex amplitude $\underline{a}_{LO}(t)$ of the reference signal 2201 is modeled as a frequency comb constituted of M equidistant, phase-locked tones, where the m-th tone with frequency $f_{LO,m}$ has a complex amplitude $\underline{A}_{LO,m}$ $$\underline{a}_{LO}(t) = \sum_{m=1}^{M} \underline{A}_{LO,m} \exp(j2\pi f_{LO,m} t). \tag{3}$$

The frequency difference between two adjacent comb lines is fixed and given by the free spectral range (FSR) $f_r$ of the comb source. The system's center frequency is defined as $$f_c = \frac{1}{M}\sum_{m=1}^{M} f_{LO,m} \quad f_{LO,m} = f_{LO,1} + (m-1)f_r. \tag{4}$$

Similarly, the use-signal 2401 $\underline{a}_S(t)$ and its Fourier transform $\tilde{\underline{a}}_S(f)$ are modeled by $$\underline{a}_S(t) = \underline{A}_S(t)\exp(j2\pi f_c t) \circ\!\!-\!\!\bullet\ \tilde{\underline{a}}_S(f) = \tilde{\underline{A}}_S(f - f_C). \tag{5}$$

Assuming a linear system, perfectly balanced photodetectors, and neglecting parasitic self-beating, the in-phase $\tilde{\underline{I}}_n(f)$ and quadrature $\tilde{\underline{Q}}_n(f)$ component after coherent reception in the n-th receiver can be modeled by $$\tilde{\underline{I}}_n(f) = \sum_{m=1}^{M} \underline{C}_{LO,m}\underline{C}_{F,n}\tilde{\underline{H}}_{nm}^{(I)}(f)\tilde{\underline{a}}_S(f + f_{LO,m}) + \underline{C}_{LO,m}^{*}\underline{C}_{F,n}^{*}\tilde{\underline{H}}_{nm}^{(I)*}(-f)\tilde{\underline{a}}_S^{*}(-f + f_{LO,m}) \tag{6}$$

$$\tilde{\underline{Q}}_n(f) = \sum_{n=1}^{M} -j\underline{C}_{LO,m}\underline{C}_{F,n}\tilde{\underline{H}}_{nm}^{(Q)}(f)\tilde{\underline{a}}_S(f + f_{LO,m}) + j\underline{C}_{LO,m}^{*}\underline{C}_{F,n}^{*}\tilde{\underline{H}}_{nm}^{(Q)*}(-f)\tilde{\underline{a}}_S^{*}(-f + f_{LO,m}) \tag{7}$$

where $$\tilde{\underline{H}}_{nm}^{(I)}(f) \text{ and } \tilde{\underline{H}}_{nm}^{(Q)}(f)$$

combine all electrical and optical characteristics of the system. The at least one model parameter of the measurement system are in this case given by $\underline{C}_{F,n}$ and $\underline{C}_{LO,m}$, and model the time-dependent optical phase or amplitude fluctuations among different tones of the reference signal ($\underline{C}_{LO,m}$) and among the transmission coefficient of different channels ($\underline{C}_{F,n}$) leading to the receivers. These time-dependent optical phase amplitude fluctuations of the reference tones arriving at the different receivers may be caused by time-dependent fluctuations of the complex amplitudes $\underline{A}_{LO,m}$ emitted by the reference comb source, or by fluctuations of the transmission properties of the signal paths to the respective receiver. In this context, the term "time-dependent" or "fluctuation" refers to a slow change of the respective property in time, such that the associated model parameters $\underline{C}_{F,n}$ and $\underline{C}_{LO,m}$ can be assumed constant during one measurement, but may vary from measurement to measurement.

By dividing $\tilde{\underline{I}}_n(f)$ and $\tilde{\underline{Q}}_n(f)$ by a corresponding transfer function, and making use of the fact that the quotient between $$\tilde{\underline{H}}_{nm}^{(I)}(-f) \text{ and } \tilde{\underline{H}}_{nm}^{(Q)}(-f)$$

does not depend on the comb line index m, one may simplify (6) and (7) to $$\frac{\tilde{\underline{I}}_n(f)}{\tilde{\underline{H}}_{nm}^{(I)*}(-f)} + j\frac{\tilde{\underline{Q}}_n(f)}{\tilde{\underline{H}}_{nm}^{(Q)*}(-f)} = \tag{8}$$

-continued $$\sum_{\mu=1}^{M} \underline{C}_{LO,\mu}\underline{C}_{F,\nu}\left[\frac{\tilde{\underline{H}}_{nm}^{(I)}(f)}{\tilde{\underline{H}}_{nm}^{(I)*}(-f)} + \frac{\tilde{\underline{H}}_{nm}^{(Q)}(f)}{\tilde{\underline{H}}_{nm}^{(Q)*}(-f)}\right]\tilde{\underline{a}}_S(f + f_{LO,m}).$$

By further defining $$\tilde{\underline{U}}_n(f) = \frac{\tilde{\underline{I}}_n(f)}{\tilde{\underline{H}}_{nm}^{(I)*}(-f)} + j\frac{\tilde{\underline{Q}}_n(f)}{\tilde{\underline{H}}_{nm}^{(Q)*}(-f)} \tag{9}$$

$$\tilde{\underline{H}}_{nm}(f) = \left[\frac{\tilde{\underline{H}}_{nm}^{(I)}(f)}{\tilde{\underline{H}}_{nm}^{(I)*}(-f)} + \frac{\tilde{\underline{H}}_{nm}^{(Q)}(f)}{\tilde{\underline{H}}_{nm}^{(Q)*}(-f)}\right] \tag{10}$$

and one may reformulate (8) as a matrix-vector equation, where the time variant parameters can be placed on a diagonal matrix to the left and the right of the frequency dependent transfer matrix $\tilde{\underline{H}}(f)$ $$\underbrace{\begin{bmatrix}\tilde{\underline{U}}_1(f)\\ \vdots \\ \tilde{\underline{U}}_N(f)\end{bmatrix}}_{\tilde{\underline{U}}(f)} = \begin{bmatrix}\underline{C}_{F,1} & \cdots & 0\\ \vdots & \ddots & \vdots\\ 0 & \cdots & \underline{C}_{F,N}\end{bmatrix}\underbrace{\begin{bmatrix}\tilde{\underline{H}}_{11}(f) & \cdots & \tilde{\underline{H}}_{1M}(f)\\ \vdots & \ddots & \vdots\\ \tilde{\underline{H}}_{N1}(f) & \cdots & \tilde{\underline{H}}_{NM}(f)\end{bmatrix}}_{\tilde{\underline{H}}(f)} \begin{bmatrix}\underline{C}_{LO,1} & \cdots & 0\\ \vdots & \ddots & \vdots\\ 0 & \cdots & \underline{C}_{LO,M}\end{bmatrix}\underbrace{\begin{bmatrix}\tilde{\underline{a}}_S(f + f_{LO,1})\\ \vdots \\ \tilde{\underline{a}}_S(f + f_{LO,M})\end{bmatrix}}_{\tilde{\underline{A}}_S(f)} \tag{11}$$

The Matrix Equation (11) can be inverted to obtain together with Eq. (9) a transformation that relates the digitized partial mixing signals 2541 related to the in-phase (I) and the quadratur (Q) component, in this case referred to as $\underline{I}_1$ to $\underline{I}_N$ and $\underline{Q}_1$ to $\underline{Q}_N$ to the use-signal 2401, in this case referred to as $\underline{a}_S$. Therefore Eq. (9) and Eq. (11) are a specific realization of the transformation stated in Eq. (1). An preferred choice for the delays introduced in the splitting element 2510 is given by $$\tau_n = \frac{n-1}{N \times f_r}. \tag{12}$$

and ensures that Eq. (11) is well conditioned for frequencies f lower than the receiver bandwidth B. The receiver bandwidth is the bandwidth of the mixing and acquisition elements (not necessarily the 3 dB bandwidth). The bandwidth B must be larger than half the FSR $$B > \frac{1}{2}f_r \tag{13}$$

In this example $|\underline{C}_{F,\nu}|=1$ and further $\varphi_{F,1}=\arg\{\underline{C}_{F,1}\}=0$ and $\underline{C}_{LO,1}=1$ is assumed and thus 3+3+3 real parameters of the detection system are estimated from the redundant information that is comprised in the total number of all partial mixing signal. In this example the reconstructed spectral components $\tilde{\underline{A}}_{S,m}'(f-f_{LO,m})$ and $\tilde{\underline{A}}_{S,n+1}'+1(f-f_{LO,m+1})$ of adjacent components of the reconstructed vector $\underline{\tilde{A}}_S'(f)$ overlap. Thus, the model parameters related to the properties of the detection system are found by minimizing a cost function that measures the error between redundant signal components $$\{\underline{C}'_{F,2}, \dots \underline{C}'_{F,N}, \underline{C}'_{LO,2}, \dots \underline{C}'_{LO,M}\} = \arg\min \left\{ \sum_{\mu=1}^{M-1} \frac{\int_{red.\,region} \left|\tilde{\underline{A}}'_{S,\mu}(f - f_{LO,\mu}) - \tilde{\underline{A}}'_{S,\mu+1}(f - f_{LO,\mu+1})\right|^2 df}{\int_{red.\,region} \left|\tilde{\underline{A}}'_{S,\mu}(f - f_{LO,\mu}) + \tilde{\underline{A}}'_{S,\mu+1}(f - f_{LO,\mu+1})\right|^2 df} \right\}. \quad (14)$$

Note that in the above equation $\tilde{\underline{A}}_{S,\mu}'(f-f_{LO,\mu})$, and $\tilde{\underline{A}}_{S,\mu+1}'(f-f_{LO,\mu+1})$ depend on the parameters $\underline{C}_{F,2}$, . . . $\underline{C}_{F,N}'$, $\underline{C}_{LO,2}'$, . . . $\underline{C}_{LO,M}'$. Further note that the estimated parameters may change depending on the specific realization of the system. For example, by photonic integration the optical phase among different receivers may be stabilized such that the parameters $\underline{C}_{F,2}'$, . . . , $\underline{C}_{F,N}'$ become time-invariant. Further note, that in that case a numerical optimization becomes obsolete as the phase between neighboring slices may for example be obtained by $$\underline{C}'_{LO,\mu} = \left\{ \frac{1}{B_R} \int_{B_R} \tilde{\underline{A}}'_{S,\mu}(f - f_{LO,\mu+1}) / \tilde{\underline{A}}'_{S,\mu+1}(f - f_{LO,\mu}) df \right\}, \quad (15)$$

where $B_R$ is the bandwidth related to the redundant region. If the LO is long-term stable, the variability of the parameters $\underline{C}_{LO,2}'$, . . . $\underline{C}_{LO,M}'$, may reduce further, and the number of parameters may be further decreased.

FIG. 14 shows an example application, for the measurement system 2000 depicted in FIG. 13 and evaluated according to the technique described in the previous paragraph. In this example, the use-signal 2401 has a bandwidth of 600 GHz and comprises several optical data signals that are modulated in amplitude and phase. The data signals were generated by individually modulating seven optical carriers provided by seven free running lasers. As reference signal, a dissipative Kerr soliton comb is with a free spectral range FSR of 150 GHz has been use. As mixing elements, four parallel coherent receivers have been exploited. FIG. 13 shows the spectrum of the reconstructed digital use-signal 2552, the constellation diagrams associated with the comprised data signals, and the signal-to-noise power ratio for each comprised data signal. These results prove that the measurement method according to claim 1 is executable.

FIG. 15 shows a practical realization of a measurement system 2000 according to FIG. 3. In this case the combining element 2330 inside the modifying element 2300 adds four single tone signals generated by independent pump sources 2340 to the use-signal 2401. The pump sources 2340 are also part of the modifying element.

FIG. 16 shows measurement results of a single tone recorded with a measurement system which is setup according to FIG. 15. Note that the subsystem of the measurement system is setup according to FIG. 13. The use-signal 2401 consists of a single tone and does not feature any spectral components in the spectral range that should contain the redundant information, thereby rendering the estimation of the at least one model parameter difficult. To overcome this problem, the modifying element 2300 adds a stitching signal to the use-signal. In this case, the stitching signal comprises four weak tones within the spectral range that is supposed to contains the redundant information. FIG. 16 shows from top to bottom:

The reconstructed digital use-signal 2551 in the time domain;

The spectrum of the reconstructed digital use-signal 2552, which comprises the tone associated with the input signal A as well as the four tones b, c, d, e associated with the stitching signal.

The spectrum of the reconstructed digital input signal 2554 which is obtained by digitally removing the modification introduced by the modifying element.

Note that the frequencies on the abscissa of both the display of the reconstructed digital use-signal 2552 (second row of FIG. 16) and the display of the reconstructed digital input-signal 2554 (third row of FIG. 16) have been shifted to cover the range from 0 to 500 GHz.

The noise bump around the tone associated with the input signal is related to the reference signal's low carrier-to-noise ratio and can be avoided by using a better reference signal source.

FIG. 17 shows a setup that can be used to calibrate the measurement system 2000. A calibration signal source 1100 is used to generate a calibration signal 1101. In this case, the measurement system 2000 processes the measured calibration signal 1101 to obtain all parameters of the system model. In the example of the measurement system 2000 described in FIG. 13, the transfer functions $$\tilde{H}_{nm}^{(I)}(f) \text{ and } \tilde{H}_{nm}^{(Q)}(f)$$

are obtained by this calibration measurement.

FIG. 18 shows an example of a calibration measurement for the measurement system 2000 according to FIG. 17, where a frequency comb according to claim 15 is used as calibration signal 1001. In this case, the measurement system 2000 is internally configured according to FIG. 13. FIG. 18 shows a detail of a spectrum of a digitized partial mixing signal 2541-*n*-*k*. As a frequency comb is used as calibration signal 1001, the mixing products of the calibration signal with different tones of the reference signal 2201 do not overlap. This allows to characterize the whole measurement system 2000 with a single-shot measurement by evaluating amplitudes and phases of the received comb tones in FIG. 13 and by comparing them to the amplitudes and phases of the comb tones emitted by the calibration signal source 1100, for which the shape of the emitted pulse was independently measured by FROG. A single-shot measurement is important as some model parameters may change between subsequent measurements.

FIG. 19 depicts some calibration results obtained from the measurement setup depicted in FIG. 17 and the calibration signal 1001 in FIG. 18. Four transfer functions that according to Eq. (6) describe the measurement system 2000 according to FIG. 13 are shown. FIG. 19 shows that a detailed calibration of amplitude and phase is obtained and the phase relationship between different detection paths is captured.

FIG. 20 shows further embodiments A to C, of the first splitting element 2510, and similar embodiments D to F for the second splitting element 2520. The first splitting element 2510 splits the use-signal 2401 into N partial use-signals 2511-1 to 2511-N. The second splitting element 2520 splits the reference signal 2201 into N partial reference signals 2521-1 to 2521-N.

A first embodiment A of the first splitting element 2510 comprises a power splitter 2512 with additional delays 2513. Note that not all delays 2513 are identical and the delays 2513 may simply be introduced by the connection between the first splitting element 2513 and the mixing elements 2530. However, the delays 2513 are indicated to show that these delays are an important design parameter for the system and must be properly chosen (example for preferred delays refer to Eq. (12)).

A second embodiment B comprises an optical filter module instead of a power splitter, which splits the use-signal into N paths and additionally applies an amplitude transfer function. This is similar to the spectrally sliced system, however, due to the defined time delays 2513, the requirements on the filters steepness and the passbands relaxed. This approach can improve the scalability of the measurement system 2000 when implemented as a photonic integrated circuit. The combination of filters and power splitters may help to avoid low signal levels at acquisition elements 2540 in case many mixing elements 2530 are used.

A third embodiment C of the first splitting element 2510 comprises both, a filter module 2514 and power splitters 2512 with defined delays 2513 and thus describes a hierarchical system. Compared to B there are less filter outputs needed, since at least one of the filter outputs is further split by a power splitter 2513. Compared to A the measurement system 2000 generates less out-of-band mixing products, and the power efficiency is improved. Note that the sequence of filter modules 2514 and power splitters 2512 may also be changed and the multi-stage hierarchical structures are possible.

The first D, second E, and third F embodiments of the second splitting element 2520 have a similar structure compared to the first A, second B, and third C, embodiment of the first splitting element 2510. However, the parameters, like time delay 2513 filter transfer function 2514 are designed independently.

FIG. 21 indicates that the measurement system 2000 outputs either the reconstructed digital use-signal A, or the reconstructed digital input signal B that is obtained by digitally correcting at least partially for the modification applied by the modifying element. It may also output their spectra C, D, or combinations of the signals mentioned above.

BIBLIOGRAPHY

[1] . . . Scott, R. P., Fontaine, N. K., Heritage, J. P., Yoo, S. J. B.: 'Dynamic optical arbitrary waveform generation and measurement', Opt. Express, 2010, 18, (18), pp. 18655-18670. https://doi.org/10.1364/OE.18.018655

[2] . . . Fang, D., et al.: 'Optical Arbitrary Waveform Measurement (OAWM) on the Silicon Photonic Platform', in: Optical Fiber Communication Conference (OFC'21), San Diego (CA), USA, Jun. 6-11, 2021; The Optical Society of America (OSA); paper F2E.G. https://doi.org/10.5445/IR/1000135495

[3] . . . Fontaine, N. K., Scott, R. P., Zhou, L., Soares, F. M., Heritage, J. P., Yoo, S. J. B.: 'Real-time full-field arbitrary optical waveform measurement', Nature Photonics, 2010, 4, (4), pp. 248-254. https://doi.org/10.1038/nphoton.2010.28

[4] . . . Fischer, J. K., Ludwig, R., Molle, L., et al.: 'High-Speed Digital Coherent Receiver Based on Parallel Optical Sampling', Journal of Lightwave Technology, 2011, 29, (4), pp. 378-385. https://doi.org/10.1109/JLT.2010.2090132

[5] . . . Valley, G. C.: 'Photonic analog-to-digital converters', Opt. Express, 2007, 15, (5), 1955-1982. https://doi.org/10.1364/OE.15.001955

[6] . . . Fontaine, N. K., Raybon, G., Guan, B., et al.: '228-GHz Coherent Receiver using Digital Optical Bandwidth Interleaving and Reception of 214-GBd (856-Gb/s) PDM-QPSK'; in European Conference and Exhibition on Optical Communication, OSA Technical Digest (online) (Optical Society of America, 2012), paper Th.3.A.1. https://doi.org/10.1364/ECEOC.2012.Th.3.A.1

[7] . . . Fontaine, N. K., Scott, R. P., Heritage, J. P., Yoo, S.J.B.: 'Near quantum-limited, single-shot coherent arbitrary optical waveform measurements', Opt. Express, 2009, 17, (15), pp. 12332-12344. https://doi.org/10.1364/OE.17.012332

[8] . . . Chen, X., Xie, X., Kim, I., Li, G., Zhang, H., Zhou, B.: 'Coherent Detection Using Optical Time-Domain Sampling', IEEE Photonics Technology Letters, 2009, 21, (5), pp. 286-288. https://doi.org/10.1109/OFC.2008.4528094

[9] . . . Okamoto, K., Ito, F.: 'Dual-Channel Linear Optical Sampling for Simultaneously Monitoring Ultrafast Intensity and Phase Modulation', Journal of Lightwave Technology, 2009, 27, (12), pp. 2169-2175. https://doi.org/10.1109/JLT.2008.2009646

[10] . . . Sunnerud, H., Skold, M., Westlund, M., Andrekson, P. A.: 'Characterization of Complex Optical Modulation Formats at 100 Gb/s and Beyond by Coherent Optical Sampling', Journal of Lightwave Technology, 2012, 30, (24), pp. 3747-3759. https://doi.org/10.1109/JLT.2012.2204957

[11] . . . Ummethala, S., Kemal, J. N., Alam, A. S., et al.: 'Hybrid Electro-Optic Modulator Combining Silicon Photonic Slot Waveguides with High-k Radio-Frequency Slotlines' (20.10.2020). https://doi.org/10.1364/OPTICA.411161

[12] . . . Kieninger, C., Fullner, C., Zwickel, H., et al.: 'Silicon-organic hybrid (SOH) Mach-Zehnder modulators for 100 GBd PAM4 signaling with sub-1 dB phase-shifter loss', Opt. Express, O E, 2020, 28, (17), p. 24693. https://doi.org/10.1364/OE.390315

[13] . . . Ummethala, S., Harter, T., Koehnle, K., et al.: 'THz-tooptical conversion in wireless communications using an ultra-broadband plasmonic modulator', Nature Photonics, 2019, 13, (8), pp. 519-524. https://doi.org/10.1038/s41566-019-0475-6

[14] . . . K. Kikuchi, "Fundamentals of Coherent Optical Fiber Communications," Journal of Lightwave Technology 34, 157-179 (2016). https://doi.org/10.1109/JLT.2015.2463719

[15] . . . N. K. Fontaine, R. P. Scott, and S. Yoo, "Dynamic optical arbitrary waveform generation and detection in InP photonic integrated circuits for Tb/s optical communications," Optics Communications 284, 3693-3705 (2011). https://doi.org/10.1016/j.optcom.2011.03.045

[16] . . . L. D. Coelho, O. Gaete, and N. Hanik, "An algorithm for global optimization of optical communication systems,", pp. 541-550. https://doi.org/10.1016/j.aeue.2009.02.009

[17] . . . J. Liu, E. Lucas, A. S. Raja, J. He, J. Riemensberger, R. N. Wang, M. Karpov, H. Guo, R. Bouchand, and T. J. Kippenberg, "Photonic microwave generation in the X- and K-band using integrated soliton microcombs," Nature Photonics 14, 486-491 (2020). https://doi.org/10.1038/s41566-020-0617-x

[18] . . . A. Khilo et al., "PhotonicADCovercoming the bottleneck of electronic jitter," Opt. Express 20, 4454-4469 (2012). https://doi.org/10.1364/OE.20.004454

[19] . . . Keysight Technologies, "Infiniium UXR-Series Oscilloscopes," Data Sheet (2019).

LIST OF REFERENCE SIGNS

100, . . . 175 . . . embodiments of a method according to the respective corresponding claim of claims 1 to 19
200, . . . 235 . . . embodiments of a measurement system 2000 according to the invention corresponding to the claims 20 to 29
1000 . . . input signal
1100 . . . calibration signal source
1101 . . . calibration signal
2000 . . . measurement system
2010 . . . amplifier
2011 . . . bandpass filter
2100 . . . input interface
2200 . . . reference signal source
2201 . . . reference signal
2210 . . . pump source
2220 . . . reference signal element
2300 . . . modifying element
2310 . . . conversion element
2320 . . . stitching signal element
2321 . . . stitching signal
2330 . . . combining element
2340 . . . pump source
2401 . . . use-signal
2500 . . . subsystem
2510 . . . first splitting element
2511 . . . the total number of all N partial use-signals
2511-*n* . . . $n^{th}$ partial use-signal where n=1, . . . N
2512 . . . power splitter
2513 . . . time delay
2514 . . . filter
2520 . . . second splitting element
2521 . . . the total number of all N partial reference signals
2521-*n* . . . $n^{th}$ partial reference signal where n=1, . . . N
2530 . . . the total number of all N mixing element
2530-*n* . . . $n^{th}$ mixing element, where n=1, . . . N
2531 . . . the total number of all partial Σ

$$\sum_{n=1}^{N} K_n$$

mixing signals generated by all N mixing elements
2531-*n* . . . the total number of all partial mixing partial mixing signals generated by the $n^{th}$ mixing element, where n=1, . . . , N
2531-*n*-*k* . . . $k^{th}$ partial mixing signal generated by the $n^{th}$ mixing element where n=1, . . . , N and k=1, 2 . . . $K_n$
2532 . . . 90-degree optical hybrid
2533 . . . balanced photodetector
2540 . . . The total number of all acquisition elements
2540-*n*-*k* . . . The $k^{th}$ acquisition element used to digitize the $k^{th}$ partial mixing signal generated by the $n^{th}$ mixing element where n=1, . . . , N and k=1, 2 . . . $K_n$
2541 . . . the total number of all digitized partial mixing signals $$\sum_{n=1}^{N} K_n$$

2541-*n* . . . the total number of all $K_n$ digitized partial mixing signals corresponding to the $n^{th}$ mixing element, where n=1, . . . , N
2541-*n*-*k* . . . $k^{th}$ digitized partial mixing signal corresponding to the $n^{th}$ mixing element where n=1, 2 . . . N, and k=1, 2 . . . $K_n$
2542 . . . analog-to-digital converter (ADC)
2550 . . . digital Signal Processor
2551 . . . reconstructed digital use-signal/digital use-signal
2552 . . . spectrum of digital use-signal
2553 . . . reconstructed digital input-signal/digital input-signal
2554 . . . spectrum of digital input-signal

The invention claimed is:

1. A method for detecting an electromagnetic use-signal with a measurement system comprising the following steps:

a. Providing an input interface for an electromagnetic input signal which is set up in such a way that an electromagnetic use-signal is provided;
b. Providing an electromagnetic reference signal source which is set up in such a way that an electromagnetic reference signal comprising M discrete tones with M≥2 is provided; and
c. Providing a subsystem, comprising:
 i. a first splitting element which is set up in such a way that the use-signal is split into a multitude of N partial use-signals with N≥2;
 ii. a second splitting element which is set up in such a way that the reference signal is split into a multitude of N partial reference signals, wherein N is the number of corresponding partial use-signals;
 iii. N corresponding mixing elements which are set up in such a way that each partial use-signal is mixed with the corresponding partial reference signal to generate a total number of $$\sum_{n=1}^{N} K_n$$

partial mixing signals, wherein the n-th mixing element generates $K_n$ partial mixing signals;
 iv. a number of $$\sum_{n=1}^{N} K_n$$

corresponding acquisition elements which are set up in such a way that the $$\sum_{n=1}^{N} K_n$$

partial mixing signals are digitized such that $$\sum_{n=1}^{N} K_n$$

digitized partial mixing signals are generated;
 v. a digital signal processor, that is setup in such a way that a digital use-signal is reconstructed from the digitized partial mixing signals using a transformation based on a system model that relates the $$\sum_{n=1}^{N} K_n$$

digitized partial mixing signals to the use-signal and that comprises at least one model parameter related to at least one of the properties of the measurement system;

d. wherein at least one partial reference signal comprises at least two spectral tones, and that e. wherein the totality of all partial mixing signals comprises redundant information that is used to determine the at least one model parameter of the measurement system.

2. The method of claim 1, wherein M≤N.

3. The method of claim 1, wherein M>N.

4. The method of claim 1, wherein in addition a modifying element is provided which is setup in such a way that the use-signal provided by the input interface is modified.

5. The method of claim 4, wherein the modifying element modifies the use-signal by at least one of the following operations:

a. adding a stitching signal to the use-signal, and/or b. converting the use-signal.

6. The method of claim 4, wherein the digital input signal is reconstructed from the reconstructed digital use-signal by at least partially removing the modification introduced by the modifying element.

7. The method of claim 1, wherein the M discrete tones of the reference signal are equidistant in frequency and derived from an optical frequency comb.

8. The method of claim 1, wherein the M discrete tones of the reference signal have a free spectral range between 10 GHz and 100 GHz.

9. The method of claim 1, wherein adjacent pulses of the reference signal overlap in time.

10. The method of claim 1, wherein the at least one model parameter estimated by means of the redundant information comprised in the totality of all partial mixing signals comprises a property of the partial reference signal or a property of an optical or electrical circuit.

11. The method of claim 1, wherein the system model comprises at least one of an amplitude or a phase of frequency-dependent transfer functions of the whole system or of parts of the system.

12. The method of claim 1, wherein characteristics of the system are extracted in a dedicated calibration measurement with a known electromagnetic waveform referred to as calibration signal that is provided by a calibration signal source.

13. The method of claim 1, wherein each mixing element has K=2 outputs, which are connected to the inputs of K=2 associated acquisition elements, each comprising an analog-to-digital converter.

14. A measurement system set up in such a way that the method of claim 1 is executable thereon, comprising:

a. an input interface;

b. an electromagnetic reference signal source which is set up in such a way that an electromagnetic reference signal comprising M discrete tones with M≥2 is provided; and c. a subsystem, comprising:

i. a first splitting element;

ii. a second splitting element;

iii. N mixing elements, wherein the $n^{th}$ mixing element generates $K_n$ partial mixing signals;

iv. a number of $$\sum_{n=1}^{N} K_n$$

corresponding acquisition elements;

v. a digital signal processor, d. wherein the input interface is coupled to the first splitting element;

e. wherein the electromagnetic reference signal source is coupled to the second splitting element;

f. wherein the n-th output of the first splitting element is coupled to the n-th mixing element;

g. wherein the n-th output of the second splitting element is coupled to the n-th mixing element;

h. wherein each of the $K_n$ outputs of the n-th mixing element is coupled to one of the $$\sum_{n=1}^{N} K_n$$

corresponding acquisition elements; and where i. wherein each acquisition element is coupled to the digital signal processor j. wherein at least one partial reference signal comprises at least two spectral tones, k. wherein the totality of all partial mixing signals comprises redundant information, and l. wherein the digital signal processor is configured to extract at least one model parameter of the measurement system from the redundant information.

15. The measurement system of claim 14, wherein the mixing element comprises one or more detection elements.

16. The measurement system of of claim 14, wherein the mixing element comprises one or more combining elements, wherein a combining element superimposes two or more signals.

17. The measurement system of claim 14, wherein the mixing element is embodied by a 90° hybrid followed by a pair of balanced photodetectors.

18. The measurement system of claim 14, wherein the mixing element comprises a microwave mixer.

19. The measurement system of claim 14, wherein all acquisition elements and the analog-to-digital converters used within all acquisition elements are synchronized in such a way that the temporal relationship between all digitized partial mixing signals is known.

20. The measurement system of claim 14, wherein the first and second splitting elements are implemented as power splitters in conjunction with distinct path delays.

21. The measurement system of claim 14, having an ENOB that is at most 1 bit lower than the ENOB of a single acquisition element.

* * * * *